(12) United States Patent
Momose

(10) Patent No.: US 7,617,129 B2
(45) Date of Patent: Nov. 10, 2009

(54) NETWORK SYSTEM, PORTABLE DATA ENTRY TERMINAL, PROGRAM, AND DATA OUTPUT TERMINAL CONTROL METHOD

(75) Inventor: Yuichiro Momose, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 791 days.

(21) Appl. No.: 11/006,260

(22) Filed: Dec. 7, 2004

(65) Prior Publication Data
US 2005/0209963 A1   Sep. 22, 2005

(30) Foreign Application Priority Data
Mar. 17, 2004  (JP)  ............... 2004-076579

(51) Int. Cl.
*G06Q 30/00* (2006.01)
(52) U.S. Cl. .................................. 705/26
(58) Field of Classification Search .................. 705/15, 705/26, 28
See application file for complete search history.

(56) References Cited

U.S. PATENT DOCUMENTS

| | | | | |
|---|---|---|---|---|
| 5,003,472 A * | 3/1991 | Perrill et al. | ........... | 705/15 |
| 5,387,784 A * | 2/1995 | Sarradin | ........... | 235/380 |
| 5,434,394 A * | 7/1995 | Roach et al. | ........... | 235/375 |
| 5,838,798 A * | 11/1998 | Stevens, III | ........... | 705/21 |
| 6,435,406 B1* | 8/2002 | Pentel | ........... | 235/380 |
| 6,973,437 B1* | 12/2005 | Olewicz et al. | ........... | 705/15 |
| 7,110,964 B2* | 9/2006 | Tengler et al. | ........... | 705/21 |
| 7,181,416 B2* | 2/2007 | Luis | ........... | 705/24 |
| 7,257,547 B1* | 8/2007 | Terase | ........... | 705/15 |
| 7,289,877 B2* | 10/2007 | Wilson | ........... | 700/232 |
| 2002/0138350 A1* | 9/2002 | Cogen | ........... | 705/15 |
| 2004/0034564 A1* | 2/2004 | Liu | ........... | 705/15 |
| 2004/0054592 A1* | 3/2004 | Hernblad | ........... | 705/15 |

FOREIGN PATENT DOCUMENTS

| | | |
|---|---|---|
| EP | 1 006 499 | 6/2000 |
| JP | 2003-122966 | 4/2003 |
| WO | WO 03/054815 | 7/2003 |

OTHER PUBLICATIONS

Software for the Verticals Myers, Edith. Datamation. Barrington: Aug. 25, 1981. vol. 27, Iss. 9; p. 80, 2 pgs.*
Correlation-based hardware prefetching by Charney, Mark Jay, Ph.D., Cornell University, 1995, 190 pages; AAT 9542429.*

* cited by examiner

*Primary Examiner*—Matthew S Gart
*Assistant Examiner*—Oluseye Iwarere

(57) ABSTRACT

A network system that uses a low cost, general purpose data input terminal reduces the control processing burden of the data input terminal. The network system has data input terminals used for data entry, mobile printers, each of which is paired in a predetermined 1:1 relationship to a specific data input terminal, and a data processing server. Each mobile printer prints data based on information input to the corresponding data input terminal. The data processing server communicates over a network with each of the data input terminal/mobile printer devices, and centrally controls the devices including their output terminals. The data processing server controls all data output by the mobile printers, such that data output by a given mobile printer is based on data from the paired data input terminal.

6 Claims, 14 Drawing Sheets

[Received order data file]

| record number | terminal ID | product order number | item count | product number 1 | product count | ... | product number n | product count | payment method | credit card number | product order receipt printed (flag) | credit card receipt printed (flag) | paid (flag) | kitchen instructions printed (flag) | order delivered (flag) |
|---|---|---|---|---|---|---|---|---|---|---|---|---|---|---|---|
| 0001 | A | A01 | 3 | 1001 | 2 | ... | ... | ... | card | 123456 | YES | YES | YES | YES | YES |
| 0002 | B | B01 | 2 | 1003 | 1 | ... | ... | ... | card | 667890 | YES | YES | YES | YES | NO |
| 0003 | A | A02 | 5 | 1002 | 3 | ... | ... | ... | cash | nothing | YES | nothing | NO | NO | NO |
| ... | ... | ... | ... | ... | ... | ... | ... | ... | ... | ... | ... | ... | ... | ... | ... |

[Data input terminal - mobile printer pairing table]

| terminal ID | logical printer name (printer ID) |
|---|---|
| A | Printer 1 |
| B | Printer 2 |

FIG. 4B

[Product table]

| Number | Name | Price |
|---|---|---|
| 1001 | hamburger | 120 |
| 1002 | fried potato | 80 |

FIG. 4C

[Last order number table]

| terminal ID | last order number |
|---|---|
| A | A10 |
| B | B10 |

FIG. 5A

[credit card payment receipt print form]

```
        Credit Card                    ~ R1
         Receipt

Date              11 Nov 2004
Credit card company  JVC
Credit card number   123456890123456
Expiration date      '04/03
Payment method       Single payment
Store name           ABC Food
Amount               ¥880

Signature _____
```

FIG. 5B

[Credit card rejection slip print form]

```
        Credit Card                    ~ R2
         Rejected

Date              11 Nov 2004
Credit card company  JVC
Credit card number 123456890123456
Expiration date      '04/03
Store name           ABC Food Reason
Over limit
```

< Data processing server >

| Record | Delivered? |
|---|---|
| 1 | Delivered |
| 2 | Delivered |
| 3 ← (old B)Delivered | Delivered |
| 4 ← (new B)Delivered | Delivered |
| 5 | Undelivered |
| 6 | Delivered |
| 7 | Undelivered |

NETWORK SYSTEM, PORTABLE DATA ENTRY TERMINAL, PROGRAM, AND DATA OUTPUT TERMINAL CONTROL METHOD

BACKGROUND OF THE INVENTION

1. Field of the Invention

The present invention relates to a network system including a data input terminal enabling data entry, a data output terminal for outputting information based on the data entered from the data input terminal, and a data processing server in communication via a network for centrally controlling the data input terminal and data output terminal. The invention also relates to a portable data entry terminal, a program, and a data output terminal control method.

2. Description of the Related Art

Restaurants and similar retail businesses commonly use portable data entry terminals communicating over a network to receive and process orders. Each waiter or waitress, i.e., customer server carries a portable data input terminal for entering customer orders. The data input terminal then sends the orders over a wireless network to a server and printer, which are also connected to the network, for processing and printing. See, for example, JP-A-2003-122966.

In this system, each customer server carries a portable data input terminal. When an order is taken from a customer, the server enters the order together with the customer's table number into the portable data input terminal, which communicates with a network system over a wireless data communication channel. The network system generates a cooking order for the kitchen and a transaction record for accounting based on the order information received from the portable data input terminal. The cooking order is sent to a printer located in the kitchen. Based on the information received from the network system, the printer prints a cooking order for the kitchen and an invoice for the customer server. The printed cooking order is taken by a member of the kitchen staff (customer server), which then prepares a meal accordingly. The printed invoice is given to the customer.

In a typical network system such as described above, the slips are printed by a printer located in the kitchen. Therefore, while the customer server enters customer orders in the hand-held data input terminal, the server must go to the printer located in the kitchen to get the printed customer invoice. The customer server must therefore travel between the customer and the kitchen each time a customer order is received, which can become quite time-consuming.

To solve this problem, more recent network systems provide a mobile printer having a wireless data communication function with the hand-held data input terminal. Customer bills can thus be printed by the customer server using the mobile printer and immediately handed to the customer without the server having to go to the kitchen or other stationary printer. At the same time, cooking orders are still printed by a printer located in the kitchen so that the kitchen staff can receive orders in a timely fashion and complete the order.

This type of network system, however, requires relatively complex wireless data communication management to handle wireless communications between the many devices, including the hand-held data input terminals and mobile printers, kitchen printers, POS terminals (point-of-sale transaction terminals), and other devices. Moreover, since each customer server usually has a hand-held data input terminal/mobile printer, the number of these devices increases as the number of customer servers currently working increases, and all such currently active terminals and printers must be managed. In addition, the hand-held data input terminals and mobile printers are used in pairs, and which mobile printer is used with which data input terminal must be managed. These variable factors make managing wireless communication even more difficult.

Network systems of this type are not limited to use in restaurants; rather, they are increasingly used in warehousing and distribution systems in which a large volume of products and goods are handled. As a result, even more functions are required. Providing such additional functionality requires developing specialized control programs, including specific wireless communications management functions appropriate to the application, and storing the control program in the network system. Introducing a network system that provides the management functionality needed to handle such complex wireless communications is expensive, and such systems are susceptible to communication problems. These problems continue to inhibit widespread adoption of wireless network systems.

OBJECTS OF THE INVENTION

An object of the present invention is therefore to provide a network system using a low cost, simple wireless communication management function to reduce the load on such function in a network that includes a data input terminal and a data output terminal for outputting information based on the data entered to the data input terminal.

A further object of the invention is to provide a portable data input terminal, a program, and a control method for a data output terminal.

SUMMARY OF THE INVENTION

To achieve the foregoing objects, embodiments of a network system, a data input terminal, and control methods for a data output terminal are provided.

In accordance with one aspect of the invention, a network system comprises one or more data input terminals enabling data entry and one or more data output terminals, each of which is paired in a predetermined one-to-one relationship with, and outputs information based on, data entered into a corresponding data input terminal. The network system further comprises a data processing server that is in communication via a network with, and centrally controls, each of data input and output terminal. The data processing server comprises a storage medium for storing pairing information linking the data input terminals with their respective data output terminals in predetermined one-to-one pairs. A data output controller for controls data output from each data output terminal, and is further configured to select, based on an instruction from a specific data input terminal, the corresponding data output terminal linked to that data input terminal by referencing the pairing information for that data input/output terminal pair.

Each data output terminal preferably includes a portable or stationary printer, which is controlled by the data output controller.

Because the data processing server controls all printing operations (data output control) of each printer (data output terminal), which is not subject to control by any other device other than the data processing server, each data input terminal need only output specific instructions and does not need to handle printer control. The control processes executed by the data input terminal(s) are thus simplified. In addition, each data input terminal only requires minimal data input and data transmission functions. In addition, the data processing server only needs a reception function to communicate with the data input terminal(s). Because the data processing server thus does not need a special communication control function, a simple, low-cost data processing server can be provided.

The data processing server preferably also has a print form storage medium for storing print forms for objects that can be printed by the printer(s), and a print data generator for referencing a print form and generating print data for printing a particular object based on an instruction from a data input terminal. Also, the data output controller preferably has a print data transmission module for sending the generated print data to the corresponding printer.

Because the data processing server thus stores the print forms for generating the object to be printed by a printer, and generates the print data by referring to the print form, the data input terminal can send only the information to be assembled with the print form to the data processing server, and the data input terminal does not need to store print forms or generate the print data. The capacity of the storage medium provided in the data input terminal can thus be reduced, and the communication control process executed by the data input terminal can be greatly simplified. The data processing server can also easily generate the print data because the server simply assembles the input data with a print form.

Further preferably, each data input terminal includes a payment processing function that comprises a product information acquisition module for acquiring product information about products ordered by a customer, a payment method information acquisition module for acquiring information indicating whether a payment method selected for the ordered products is cash payment or credit card payment, a card information acquisition module for acquiring information pertaining to a credit card presented by the customer when credit card is selected as the method of payment, and a card transaction information transmission module for sending the product information and credit card information as card transaction information to the data processing server. Preferably, the data processing server further comprises a card transaction information storage medium for storing the card information linked to the product information when card transaction information is received from the data input terminal, an order total calculator for calculating a total amount of the ordered products based on the product information, a card authorization module for acquiring a credit card authorization based on the card information, and a credit card transaction module for completing the credit card transaction based on the order total when charging the credit card is authorized by the card authorization module. The print data generator generates card authorization result print data for printing based on the card authorization result, and the print data transmission module sends the card authorization result print data to the corresponding printer.

Each data input terminal can be used as a simple POS terminal with this aspect of the invention because each data input terminal also has a payment processing function. In addition, if the customer elects to pay by credit card, a data input terminal can acquire both the product information and card information, and simply send the product information and card information as credit card transaction information to the data processing server. A data input terminal therefore does not need to calculate the total purchase amount for the ordered items, receive the result of the credit card authorization, instruct the corresponding printer to print the card authorization result, or control printing. There is thus little change in the control process run by a data input terminal, even when a credit card transaction processing function is executed in the data input terminal, and a data input terminal does not require the ability to receive data.

Real-time inventory management and sale processing are also possible because the data processing server receives the credit card transaction information and stores the card information linked to the product information.

Yet further preferably, the network system is further configured such that a cash transaction processing terminal is included that is centrally controlled over the network by the data processing server and that processes cash payments based on product information acquired by each data input terminal that does not have a cash payment processing function. Each data input terminal further comprises a cash transaction information transmission module for sending a product order number and product information as cash transaction information to the data processing server for later processing the cash payment when cash is selected as the payment method. The data processing server further comprises a cash transaction information storage medium for storing the product order number linked to the product information when the cash transaction information is received from the data input terminal. The print data generator generates product order receipt print data for printing a receipt object used to complete a cash transaction at the cash transaction processing terminal based on the product order number stored in the cash transaction information storage medium. The print data transmission module sends the product order receipt print data to the appropriate one of the printers, each of which includes a print mechanism for printing product order receipt print data to a receipt object. Also, the cash transaction processing terminal comprises a product order number reader for reading the product order number by image scanning the product order receipt print data printed on the receipt object, a product information reader for reading the product information from the cash transaction information storage medium of the data processing server based on the read product order number, and a cash payment processor for completing the cash transaction based on the product information.

When it is difficult or undesirable due to security, for example, for the operator of a data input terminal to carry cash, this aspect of the invention enables product orders to be received at a data input terminal while cash payments are handled at a cash payment processing terminal, such as a checkout counter. Each data input terminal is thus used only as an order-taking terminal.

Furthermore, because the data processing server receives and stores the cash transaction information linked to the product order number and product information, real-time inventory management and sale processing are still possible even when the order is paid by cash.

Furthermore, the customer also does not need to tell the operator of the cash payment processing terminal that an order was already placed or that the customer wants to pay by cash. More particularly, the customer can simply present the product order receipt printed from the printer and quickly complete the purchase. The data input terminal and printer are preferably located near each other in this situation. This enables the data input terminal operator that received the order from the customer to immediately print a receipt for the order and hand the receipt to the customer.

When the data input terminal thus cannot process cash payments, and cash payment is completed later, the purchased products are preferably only delivered to the customer after confirming that payment has been made.

A network system according to another aspect of the present invention comprises one or more data input terminals enabling data entry, and one or more printers used in a predetermined 1:1 relationship with respective data input terminals. Each printer prints based on data entered into its paired data input terminal. A data processing server is in communication via a network with, and centrally controls, each data input terminal and printer, wherein the data processing server has an input data receiver for receiving input data sent from the data input terminal(s). The system further comprises a print data generation determining module for determining based on the input data whether to generate print data for printing, a print data generating module for generating print data according to the determination made by the print data generating determining module; and a print data transmission module for sending the print data to the appropriate printer(s).

Preferably, the data processing server also has a print form storage medium for storing print forms for objects that can be printed, and the print data generating module references a print form and generates print data based on the received input data.

In still another aspect of the invention, a network system comprises at least one data input terminal enabling data entry, and at least printer used in a predetermined 1:1 relationship with a corresponding data input terminal. Each printer prints based on data entered into its paired data input terminal. A data processing server is in communication via a network with, and centrally controls, each data input terminal and printer. The data processing server comprises an input data receiver for receiving input data sent from the data input terminal(s), a print form storage medium for storing a plurality of print forms for objects that can be printed, a print form selector for selecting one print form from the plurality available based on the input data, a print data generating module for referencing the selected print form and generating print data for printing the selected object, and a print data transmission module for sending the print data to the appropriate printer(s).

The data processing server in this aspect of the invention thus determines whether to generate print data (output data) based on input data received from the data input terminal. A data input terminal thus does not need to determine whether to generate the print data or control printing. Control processing by both the data input terminal(s) and data processing server is thus simplified. Each data input terminal can thus be provided with only the minimum data input and data transmission functionalities; no other special processing capabilities are required. The data processing server also only needs the ability to receive data from a data input terminal in order to process information from that data input terminal.

A data input terminal in this aspect of the invention does not need to store print forms; rather, it can simply send the input data to be assembled with the print form to the data processing server because the data processing server stores the print forms for generating the print data and generates the print data by referencing a print form based on the input data received from the data input terminal. The capacity of the storage medium provided in a data input terminal can thus be reduced, and the communication control process executed by a data input terminal can be greatly simplified. The data processing server can also easily generate the print data because the server simply assembles the input data with a print form.

The data processing server in this aspect of the invention thus selects one output form from among the multiple print forms (output forms) stored on the server based on the input data from a data input terminal, which can therefore simply send the input data to the data processing server to be assembled with the print form. A data input terminal does not need to send a print form, a print form selection signal, or control printing. A variety of forms can thus be printed according to the input data without particularly complicating the control process run by a data input terminal. A data input terminal can thus be provided with only the minimum data input and data transmission functionalities; no special processing capabilities are required. The data processing server also only needs the ability to receive data from a data input terminal in order to process information from that data input terminal.

Another aspect of the invention is a control method for a data output terminal in a network system that comprises at least one data input terminal enabling data entry, at least one data output terminal used in a predefined 1:1 relationship with the corresponding data input terminal for outputting data based on information input into the corresponding data input terminal, and a data processing server in communication over a network with, and for centrally controlling, each data input and output terminal.

In one embodiment, the method comprises the data processing server controlling data output by a particular data output terminal based on instructions from the paired data input terminal.

In another embodiment of the method, the data processing server executes the steps of: receiving input data sent from a data input terminal; selecting the data output terminal linked to the data input terminal from which the input data was received by referencing pairing information for that data input terminal based on the received input data; determining whether to generate output data for output by the selected data output terminal; generating the output data based on the result of the determination; and sending the output data to the selected data output terminal.

In still another embodiment of the method, the data processing server stores a plurality of output forms for generating output data to be output, and executes steps of: receiving input data sent from a data input terminal; selecting one output form from the plurality of output forms based on the input data; referencing the selected output form and generating the output data; and sending the output data to a printing device.

A network system as described above preferably includes a plurality of data input terminals and a plurality of printers. In addition, the data processing server has a pairing information storage medium for storing information linking the data input terminals and printers (in the output data terminals) in predetermined 1:1 pairs; a data output controller for selecting the corresponding printer based on an instruction from the data input terminal by referencing the pairing information for the data input terminal, and controlling all data output from the printers; a one-way data input receiving module for only receiving input data sent from the data input terminals; and a one-way print data transmission module for only sending the print data to the corresponding printers.

Selection of a particular printer for printing is thus determined based on the pairing information stored in the data processing server, and a data input terminal therefore does not need to add information identifying its output printers each time that data input terminal sends information to the data processing server.

As a result, the data processing server does not need to run a complicated communication control process to control input/output such as, for example, detecting the operating status of each data input terminal and printer based on additional input data, and identify which data input terminal sent the data and which printer is to be used for printing.

Furthermore, because in order to communicate with the data processing server each data input terminal only needs a one-way communication means for sending information to the data processing server, the data processing server only needs a one-way communication means for receiving data sent from the data input terminal(s).

Yet further, because the printer terminal only requires a means of receiving data, the data processing server only requires a one-way print data transmission means for sending print data to the printer(s).

A low cost, simple network can thus be used because the data processing server uses one-way communication channels to handle input from multiple data input terminals and output to multiple printers based on predetermined pairing information.

Furthermore, even if a printer or data input terminal malfunctions, the terminal that did not malfunction (either printer or data input terminal) can continue to be used by simply modifying the pairing information stored on the server.

Yet further, additional printer and data input terminal sets can be added to the network easily by simply adding the corresponding pairing information to the server.

A portable data input terminal according to a further aspect of the present invention is portable and functions as a data input terminal in a network system as described above wherein the network is a wireless network.

A low-cost, simple data input terminal that can thus be used anywhere in the network system can thus be provided. Such portable data input terminals include PHS and cell phone handsets that can connect to the network system.

A program according to a further aspect of the present invention directs the functions of a data input terminal or data processing server in a network system according to the present invention as described above. This simplifies the communication control process of a data processing server, while enabling the use of a low-cost data input terminal having only simple functionality is therefore provided.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 3 shows the structure of a received order data file stored and used on a file server;

FIG. 4 shows the structures of data tables stored and used on a file server;

FIG. 5 shows print forms used for generating print data for printing credit card authorization results;

DESCRIPTION OF THE PREFERRED EMBODIMENTS

Preferred embodiments of a network system, a portable data input terminal, a program, and a control method for a data output terminal according to the present invention are described below with reference to the accompanying figures.

A network system according to one embodiment of the present invention connects at least one data input terminal enabling data entry, at least one data output terminal for outputting information based on the data entered into the corresponding data input terminal, with each data output terminal paired one-to-one in a predetermined relationship to a specific data input terminal, and a data processing server in communication with the data input terminal and data output terminal via a network for centrally controlling the data input terminal and data output terminal.

The data processing server stores information linking each data input terminal to its dedicated data output terminal in a predetermined one-to-one relationship, and controls all data output by the data output terminals by referencing the pairing information for a particular data input terminal in response to a command from that data input terminal and selecting the corresponding data output terminal based on the referenced pairing information.

A network system according to the present invention is described below using, by way of example, a product sales system in a fast-food store or other restaurant selling food that requires cooking and preparation, such as take-out food (product). A customer server carrying a data input terminal takes product orders from customers and handles payment for those orders, and then retrieves the product fulfilling the order (and processes payment when payments are not processed at the data input terminal) by going to a specific place.

Figure 1:
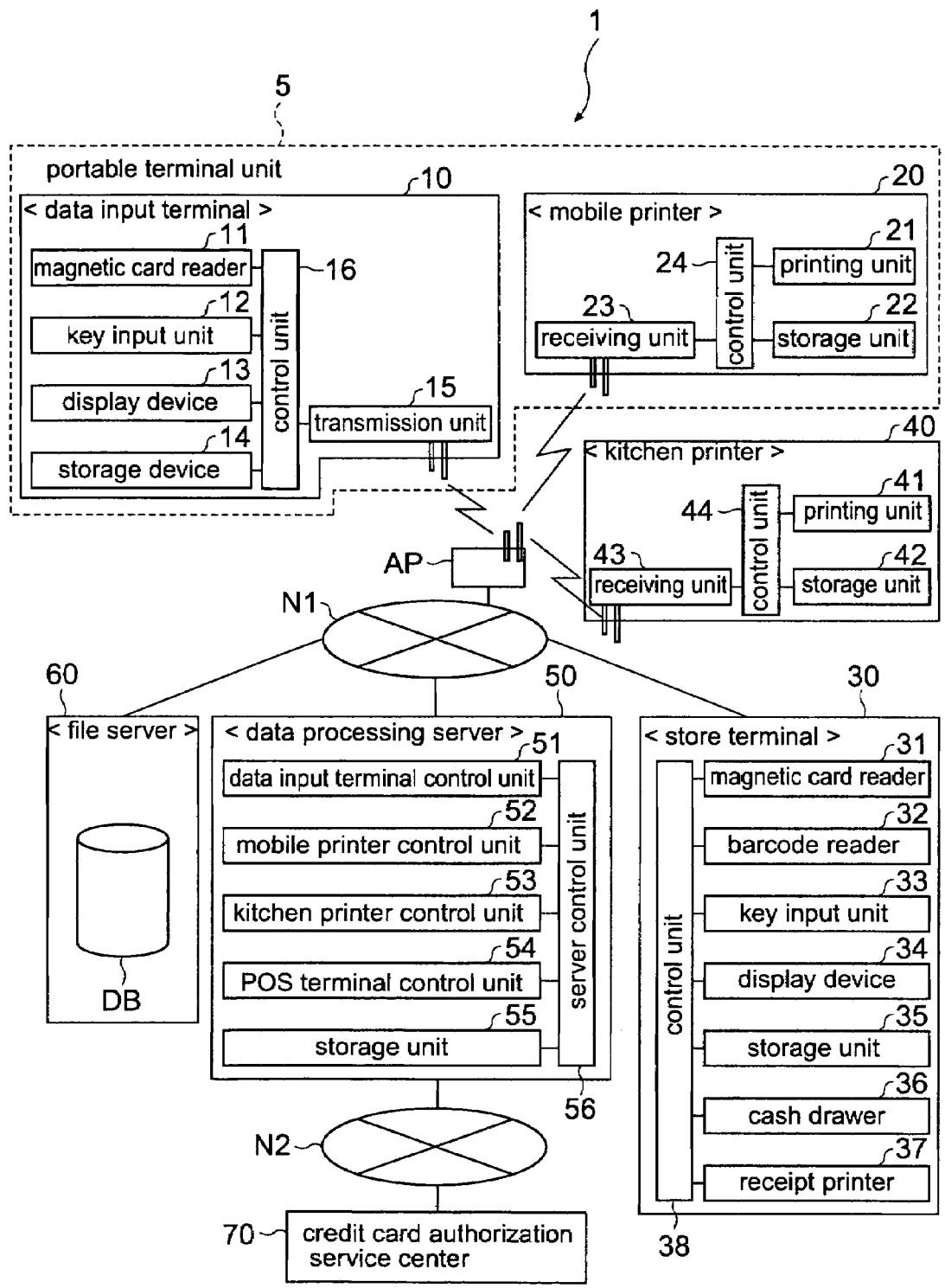
FIG. 1 is a schematic diagram of a product sales system, according to a first embodiment of the present invention.

FIG. 1 is a schematic diagram showing a product sales system 1 according to an embodiment of the invention. As shown in FIG. 1, this product sales system 1 has a data input terminal 10, a mobile printer 20, a store terminal (POS terminal) 30, a kitchen printer 40, a data processing server 50, and a file server 60 connected over a local area network N1.

A customer server receiving a food order from a customer enters the order into the data input terminal 10, which is a commercial PDA providing both an order-taking function and a credit card processing function.

The mobile printer 20 prints a receipt based on the customer order entered to the data input terminal 10.

The store terminal 30 is a stationary POS terminal installed in the store to provide order-taking functions and transaction processing for both cash and credit card payments.

The kitchen printer 40 prints slips for communicating the content of orders received via the data input terminal 10 or store terminal 30 to the kitchen for preparation.

The data processing server 50 provides central control and management of the data input terminal 10, mobile printer 20, store terminal 30, and kitchen printer 40. The file server 60 functions as a storage medium for the data processing server 50.

Figures 6A, 6B:
FIG. 6 shows print form for generating print data for printing product order receipts and kitchen instructions.

One data input terminal 10 and one mobile printer 20 are paired one-to-one in a particular portable terminal unit 5 that is used by a single operator (customer server). The operator carrying the portable terminal unit 5 receives a product order from a customer somewhere in the store that is within wireless communication range, prints a product order receipt R3 (such as shown in FIG. 6A) from the mobile printer 20, and hands the receipt to the customer.

The customer can chose whether to pay for the order in cash or by credit card. If paying by cash, the customer takes the product order receipt R3 to the store terminal 30 (e.g., checkout counter), pays for the purchase, and receives the product.

If the customer wants to pay by credit card, the credit card payment can be processed at the data input terminal 10. After processing the credit card payment, the operator hands both the product order receipt R3 and credit card payment receipt R1 (such as shown in FIG. 5A) to the customer.

If the credit card is rejected, however, the operator gives the customer a credit card rejection slip R2 (such as shown in FIG. 5B) instead of a credit card payment receipt R1. Customers that pay by credit card also go to the checkout counter to receive the purchased product.

When an order is received from a customer, the data input terminal 10 sends the order content (order receipt data) to the data processing server 50. The data processing server 50 stores the order information on the file server 60. When a transaction process is completed at the data input terminal 10 or store terminal 30, the order content is read from the file server 60 and sent to the kitchen printer 40. A cook (operator) in the kitchen then prepares the order based on the printed cooking order. Customers can thus conveniently place orders with the operator carrying the data input terminal 10 and credit card payments can be processed by the operator using the data input terminal 10 without requiring the customer to go to the store terminal 30 (checkout counter) to place and pay for the order. Because the food has thus already been prepared, the customer does not need to wait at the checkout counter when ordering food that requires cooking, and can quickly receive the ordered product.

The individual devices used in this product sales system 1 are further described below.

The data input terminal 10 has a magnetic card reader 11 for reading magnetically encoded data from the magnetic stripe on a credit card presented by the customer, for example, and a key input unit 12 or other input device for entering customer order information. In addition, the customer order information entered using the key input unit 12, product price information and the order total are displayed on a display device 13, and a storage device 14 stores the customer order information input from the key input unit 12 and a product table such as shown in FIG. 4B. The data input terminal 10 also has a transmission unit 15 for sending information to the data processing server 50 via a wireless LAN access point AP connected to the LAN N1, and a control unit 16 for controlling the other parts of the data input terminal 10.

The magnetic card reader 11 is not limited to reading credit cards, and could also be used for reading magnetic information from a preferred customer card, member's card, or other type of card. If the preferred customer card or member's card has a point accumulation function, for example, points are tallied and awarded according to the purchase amount or purchased products by the control unit 16 or as instructed by the data processing server 50.

The key input unit 12 could be a touch-screen panel or keyboard, and is used to enter order information and payment method information.

The display device 13 is used to present menus and prompts assisting data entry by the operator, to present instructions for the operator, and to report errors.

The storage device 14 could include RAM for storing order information and product tables, and ROM for storing a terminal ID for the data input terminal 10.

The control unit 16 adds this terminal ID to the beginning (header) of information sent to the data processing server 50. Based on the terminal ID, the data processing server 50 references a data input terminal-mobile printer pairing table (described below and shown in FIG. 4A) to determine which mobile printer 20 is used for data output.

The control unit 16 also assigns a product order number that is unique to each customer or transaction to identify each order, and controls calculating the order total based on the order content entered from the key input unit 12.

The control configuration of the mobile printer 20 is described next. The mobile printer 20 has a printing unit 21 for printing receipts based on the information entered from the data input terminal 10, a storage unit 22 for storing print data and control data sent from the data processing server 50, a receiving unit 23 for receiving information from the data processing server 50 through the wireless LAN access point AP, and a control unit 24 for controlling the other parts of the mobile printer 20.

The printing unit 21 is used to print credit card payment receipts R1 such as shown in FIG. 5A, credit card rejection slips R2 such as shown in FIG. 5B, and product order receipts R3 such as shown in FIG. 6A.

As noted above, the storage unit 22 includes RAM for storing print data and command data, and ROM for storing a printer ID. When print data or control data with the corresponding printer ID is sent from the data processing server 50, the control unit 24 receives the print data or control data and controls printing accordingly.

The control configuration of the store terminal 30 is described next. The store terminal 30 has a magnetic card reader 31, barcode reader 32, key input unit 33, display device 34, storage unit 35, cash drawer 36, receipt printer 37, and a control unit 38 for controlling the other parts (peripherals) of the store terminal 30.

The magnetic card reader 31 reads magnetically encoded information from the magnetic stripe of a credit card or other magnetic card presented by a customer. The barcode reader 32 reads the barcode (see FIG. 6A) printed on a product order receipt R3 indicating that an order was received and placed via the data input terminal 10. The key input unit 33 is used for entering order information and payment information, for example. The display device 34 displays the price and other information relating to the order entered using the key input unit 33, and the order total. The storage unit 35 temporarily stores the order content entered from the key input unit 33 and product tables (see FIG. 4B, for example). The cash drawer 36 holds cash and other payment instruments, and the receipt printer 37 prints receipts based on the order information entered from the key input unit 33.

The magnetic card reader 31, key input unit 33, and display device 34 perform the same function as the corresponding parts of the data input terminal 10, and the receipt printer 37 runs the same processes as the printing unit 21 of the mobile printer 20. The storage unit 35 stores the same information stored in the storage devices 14, 22 of the data input terminal 10 and mobile printer 20, but does not store the terminal ID and printer ID information identifying what device output the information input to the store terminal 30. The control unit 38 controls communication with the data processing server 50 and receipt printer 37.

In addition to processing payment for orders received at the store terminal 30, the store terminal 30 also processes cash payments for orders received by a data input terminal 10. Therefore, the control unit 38 processes transactions for orders received by the store terminal 30 based on information entered from the key input unit 33. For orders received by the data input terminal 10, the control unit 38 queries the data processing server 50 (file server 60) based on the barcode data (product order number) read from the product order receipt R3 by the barcode reader 32 to acquire the order receipt data (product information) and process the transaction. The control unit 38 also sends order content entered from the key input unit 33 and payment information (either cash or credit card payments) to the data processing server 50.

The control configuration of the kitchen printer 40 is described next. The kitchen printer 40 has a printing unit 41, storage unit 42, receiving unit 43, and a control unit 44 for controlling the other parts of the kitchen printer 40.

The printing unit 41 prints receipts based on information input from the data input terminal 10 or store terminal 30.

The storage unit 42 stores the print data and control data sent from the data processing server 50.

The receiving unit 43 receives information from the data processing server 50 through the wireless LAN access point AP.

Similarly to the operation of the mobile printer 20, the printing unit 41 of the kitchen printer 40 prints a kitchen instruction receipt R4 such as shown in FIG. 6B based on print data and control data sent from the data processing server 50.

The control configuration of the data processing server 50 and file server 60 is described next. The data processing server 50 has a data input terminal control unit 51 for controlling the data input terminal 10; a mobile printer control unit 52 for controlling the mobile printer 20; a kitchen printer control unit 53 for controlling the kitchen printer 40; a POS terminal control unit 54 for controlling the store terminal 30; a storage unit 55; and a server control unit 56 for controlling these other parts of the data processing server 50. The storage unit 55 stores the product tables (such as shown in FIG. 4B) and the data input terminal—mobile printer pairing table linking the terminal IDs and printer IDs (such as shown in FIG. 4A).

The data processing server 50 is connected to a credit card authorization service center 70 over a public or private network N2, such as the Internet, for credit card verification and authorization. The credit card authorization service center 70 (referred to below as the "authorization server") is operated by a credit card company or a clearing house that contracts with multiple credit card companies to provide card verification and authorization services. Based on the card information acquired by the data input terminal 10 or store terminal 30, the authorization server 70 looks for any lost or stolen card reports, determines whether the charge can be applied to the card, and returns an authorization report based on this search to the data processing server 50.

The file server 60 is a large-capacity storage device for storing a database DB containing a received order data file OF (see FIG. 3) containing product order history and sales history information, and various tables (see FIG. 4) used for control of the data processing server 50.

The data input terminal control unit 51 passes information received from the data input terminal 10 to the server control unit 56.

The mobile printer control unit 52 references the data input terminal-mobile printer pairing table (referred to below as the "terminal-printer table") stored in the file server 60 to identify which mobile printer 20 is used with the data input terminal 10 from which data was received, generates print data (data for printing the card authorization report and product order receipt R3) based on the received information, and controls sending the print data to the identified mobile printer 20.

The kitchen printer control unit 53 generates print data (data for printing a kitchen instruction receipt R4) based on the information received from the data input terminal 10 or store terminal 30, and controls sending the print data to the kitchen printer 40 after verifying that the data input terminal 10 or store terminal 30 completed processing payment.

In response to a request from the store terminal 30, the POS terminal control unit 54 sends a product table or product information for received orders, and passes information received from the store terminal 30 to the server control unit 56. Based on information received from the store terminal 30, the POS terminal control unit 54 generates print data (data for printing the card authorization report and product order receipt R3) for printing by the receipt printer 37, and controls returning this print data to the store terminal 30.

The mobile printer control unit 52, kitchen printer control unit 53, and POS terminal control unit 54 control printing based on a POS application program and OLE for Rental POS ("OPOS" below) printer driver stored in the storage unit 55 described below and used on an operating system such as Windows®.

OPOS provides a device-independent interface enabling applications running on the operating system to access different printers and other peripheral devices. OPOS consists of a device control object (CO) for each device category, and a service object (SO) for each model of device in a particular category. The application program generates print data based on information received from the various terminals, and passes the print data to the printer control object. The printer CO then passes the print data to the service object SO for the particular printer used for printing. The printer SO more specifically processes the print data to generate print commands conforming to the command system of the particular printer, and sends the print commands through the operating system to the printer.

The storage unit 55 is used as working memory including ROM for storing the POS application program and OPOS as a control program, and RAM or flash ROM for temporarily storing information acquired from the data input terminal 10, store terminal 30, and file server 60. The information stored in the storage unit 55 and the database DB of the file server 60 is described in further detail with reference to FIG. 2.

The server control unit 56 acquires, processes, and distributes information processed in the data processing server 50, and sends information that should be stored for central management by the product sales system 1, including product information (order data) and transaction data, to the file server 60 for storage in the database DB. The server control unit 56 also reads and returns the required information from the database DB when there is a query from the store terminal 30, for example, for past sales history data. When the server control unit 56 receives card information from the data input terminal 10 or store terminal 30, the server control unit 56 queries the authorization server 70 over the network N2 to verify the credit card, and then instructs the mobile printer 20 or the receipt printer 37 of the store terminal 30 to print the card authorization result or rejection slip.

A preferred configuration of the product sales system 1 according to this embodiment of the invention is described above, but the present invention shall not be so limited. More particularly, the product sales system 1 could include a plurality of portable terminal units 5 and store terminals 30.

Yet further, if the system of this invention is used in a large store or restaurant with multiple kitchens, there could also be a plurality of kitchen printers 40.

Yet further, the kitchen printer 40 could be connected with a wired connection rather than wirelessly, and the store terminal 30 could also be connected with a wired connection rather than wirelessly.

Figure 2:
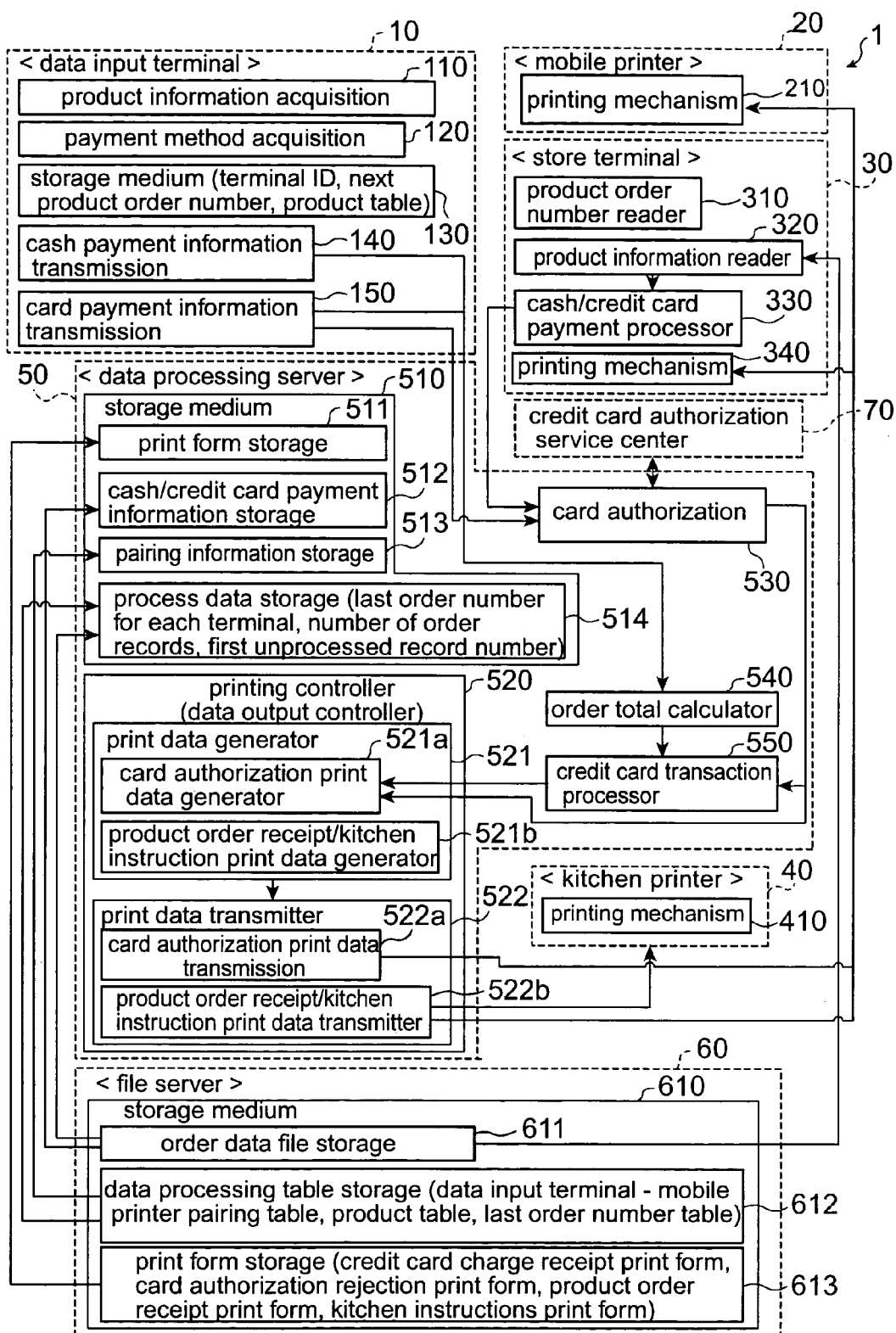
FIG. 2 is a functional block diagram of the product sales system, according to the first embodiment of the present invention.

A product sales system 1 according to an embodiment of the invention is described next with reference to the functional block diagram shown in FIG. 2. Note that the figure omits certain functions, such as the control and communication functions, so as to focus on those features more directly pertinent to the present invention.

The functions of the data input terminal 10 are described first. The data input terminal 10 includes the following functional modules: product information acquisition 110, payment method acquisition 120, cash payment information transmission 140, and card payment information transmission 150. A storage medium 130 is also embodied in data input terminal 10.

The product information acquisition module 110 and payment method acquisition module 120 together constitute the major functional part of the key input unit 12 shown in FIG. 1. The product information acquisition module 110 gets the product information (order content) for the products purchased by a customer. The payment method acquisition module 120 gets information about the payment method selected by the user for the product information acquired by the product information acquisition module 110, and more specifically whether the customer is paying by cash or credit card.

The storage medium 130 corresponds to the storage device 14 shown in FIG. 1, and more specifically stores the terminal ID of each data input terminal 10, the same product table stored in the data processing server 50, and the next-order number. The next-order number is the number assigned by a data input terminal 10 to the next order received.

The cash payment information transmission module 140 and card payment information transmission module 150 are the major components of the transmission unit 15 shown in FIG. 1. When the payment method acquisition module 120 determines that cash payment was selected, the cash payment information transmission module 140 sends the product order number and product information to the data processing server 50 as the cash payment information, which is later needed to complete the cash payment and purchase. When the payment method acquisition module 120 determines that payment is by credit card, the card payment information transmission module 150 sends the acquired card information and product information as the card payment information to the data processing server 50.

The functions of the mobile printer 20 and kitchen printer 40 are described next. The mobile printer 20 and kitchen printer 40 each have a printing mechanism 210, 410, which constitute the major components of the respective printing units 21, 41 (see FIG. 1). Both printing mechanisms 210, 410 print based on print data (or associated control data and printer ID) sent thereto from the print data transmission module 522 of the data processing server 50.

The functions of the store terminal 30 are described next. The store terminal 30 has a product order number reader 310, product information reader 320, cash/credit card payment processor 330, and printing mechanism 340.

The product order number reader 310 is the major component of the barcode reader 32 (FIG. 1), and reads the product order number by reading the product order receipt print data (i.e., reading the barcode) printed on the product order receipt R3 (see FIG. 6A).

Based on the product order number read by the product order number reader 310, the product information reader 320 reads the product information from the database DB stored on the file server 60 (and more specifically from the order data file storage 611 further described below).

The cash/credit card payment processor 330 processes payment based on the product information read by the product information reader 320 and the order total calculated from the product information when cash payment is selected.

When credit card payment is selected, the cash/credit card payment processor 330 processes payment based on the product information, the order total, and the card information read by the magnetic card reader 31 (see FIG. 1).

The printing mechanism 340 corresponds to the receipt printer 37 (FIG. 1), and prints based on the transaction content (such as receipt information) from the cash/credit card payment processor 330, and print data (such as the card authorization print data) sent from the print data transmission module 522 of the data processing server 50.

The store terminal 30 is also capable sending the cash payment information and card payment information acquired by the magnetic card reader 31 or key input unit 33 to the data processing server 50.

The functions of the data processing server 50 are described next. The data processing server 50 includes a storage medium 510, printing controller (data output controller) 520, card authorization module 530, order total calculator 540, and credit card transaction processor 550.

Storage medium 510 corresponds to the storage unit 55 shown in FIG. 1, and includes print form storage 511, cash/credit card payment information storage 512, pairing information storage 513, and process data storage 514.

The print form storage 511 stores various print forms used for printing by the mobile printer 20, kitchen printer 40, and receipt printer 37. The cash/credit card payment information storage 512 stores cash and credit card payment information received from the data input terminal 10 and store terminal 30.

When the product sales system 1 has a plurality of portable terminal units 5 (see FIG. 1), as in the preferred arrangement, information pairing each data input terminal 10 to a particular mobile printer 20 is predefined to form 1:1 pairs in a terminal-printer table such as shown in FIG. 4A. This pairing information, that is, terminal-printer table, is stored in the pairing information storage 513.

The process data storage 514 stores a last order number for each terminal, received order record count, and first unprocessed record number. The last order number is the number of the last order received by a data input terminal 10 or store terminal 30. The received order record count tells the number of orders stored in the received order data file OF stored in the file server 60. The first unprocessed record number stores the record number of the first order that has been stored in the received order data file OF but has not been fulfilled (that is, the product has not been delivered to the customer).

Storage medium 510 of the data processing server 50 described above could alternatively be incorporated in the file server 60.

The printing controller 520 corresponds to the mobile printer control unit 52, kitchen printer control unit 53, and POS terminal control unit 54 shown in FIG. 1, and has a print data generator 521 and print data transmitter 522.

The print data generator 521 generates print data by referencing print forms for issuing different printed output (such as receipts and slips) based on commands from the data input terminal 10 and store terminal 30. The print data generator 521 has a card authorization print data generator 521a and a product order receipt/kitchen instruction print data generator 521b. The card authorization print data generator 521a generates print data for credit card payment receipts R1 and credit card rejection slips R2. The product order receipt/kitchen instruction print data generator 521b generates print data for product order receipts R3 and kitchen instruction receipts R4.

The print data transmitter 522 has a card authorization print data transmission module 522a and product order receipt/kitchen instruction print data transmitter 522b for sending the print data generated by the print data generator 521 to the appropriate mobile printer 20, kitchen printer 40, or store terminal 30 (receipt printer 37).

The card authorization module 530 accesses the authorization server 70 to verify payments made with a credit card based on the card information contained in the card payment information acquired from the data input terminal 10 or store terminal 30.

The order total calculator 540 calculates the total of the ordered products based on the product information contained in the cash payment information or card payment information acquired from the data input terminal 10 or store terminal 30.

If the data input terminal 10 or store terminal 30 has a function for calculating the order total, the data input terminal 10 or store terminal 30 can output the order total together with the product information, and the order total calculator 540 can be omitted.

If the card authorization module 530 reports that payment by credit card is authorized, the credit card transaction processor 550 processes the credit card payment based on the order total calculated by the order total calculator 540, and the payment is then processed by the card authorization print data generator 521a.

The functions of the file server 60 are described next. The file server 60 has a storage medium 610, which corresponds to the database DB shown in FIG. 1. Storage medium 610 includes order data file storage 611, data processing table storage 612, and print form storage 613. The order data file storage 611 stores the received order data file OF (see FIG. 3) from which information is served to the cash/credit card payment information storage 512 or process data storage 514 of the data processing server 50.

The data processing table storage 612 stores data for serving information to the pairing information storage 513 and process data storage 514 of the data processing server 50. More specifically, the data processing table storage 612 stores the data input terminal-mobile printer pairing table, a product table, and a last terminal order number table. These tables are shown in FIG. 4.

The data input terminal-mobile printer pairing table (pairing information) records the 1:1 pairings of data input terminals 10 and mobile printers 20, and includes a table (further described below) linking cooking order IDs to a particular kitchen printer ID, and a receipt printer 37 table. The product table is used to serve information to the store terminal 30, and is also stored in the data input terminal 10. The last terminal order number table records the number of the last order received by each data input terminal 10 and store terminal 30.

The print form storage 613 stores data for serving information to the print form storage 511 in the data processing server 50. More specifically, the print form storage 613 stores a credit card charge printing form used to print a credit card payment receipt R1; a card authorization rejection form for printing a credit card rejection slip R2; a product order receipt printing form for printing a product order receipt R3; and a kitchen instruction printing form for printing a kitchen instruction receipt R4.

These printing forms contain information describing what information is printed where on a particular receipt or slip, information about the characters used to print the information, and other graphical design information.

The received order data file OF stored in the file server 60 is described next with reference to FIG. 3, which shows that the received order data file OF is a table containing multiple records of information about each order received. Each record contains multiple fields, and the records are arranged in record number sequence.

The order records (received order data) are output from the table only after order entry is completed by the data input terminal 10 or store terminal 30. The fields in each record are overwritten (updated) as order processing proceeds. The record numbers are assigned by the data processing server 50 (server control unit 56) in the order in which the first data for each order (record) is received.

Each order record in this received order data file OF has the following fields: record number, terminal ID, product order number, item count, product number, product count, payment method, credit card number, product order receipt printed, credit card receipt printed, paid, kitchen instructions printed, and order delivered.

The record number is the number of each record in the received order data file OF.

A unique terminal ID is assigned to each system terminal (data input terminal 10 and store terminal 30), and the terminal ID field stores the terminal ID indicating the terminal from which the order was received.

The product order number field is assigned to each order by the terminal 10 or 30 where the order was received and entered.

The item count field stores the number of items in the product information fields, that is, the number of different products ordered.

The product number field stores the identification number (product code) of each item, and the product count field stores the number of items identified by the product number that were ordered.

The payment method field identifies whether payment is by cash or credit card.

The credit card number field stores the credit card number in the card information read by the magnetic card reader 31 when payment is by credit card.

The product order receipt printed field is a boolean (flag) indicating whether or not the data processing server 50 (either mobile printer control unit 52 or POS terminal control unit 54) has sent a product order receipt R3 print command to the mobile printer 20 or store terminal 30 (receipt printer 37).

The credit card receipt printed field is a boolean (flag) indicating whether or not the data processing server 50 (mobile printer control unit 52 or POS terminal control unit 54) has issued a credit card payment receipt R1 print command to the mobile printer 20 or store terminal 30 (receipt printer 37) when payment is by credit card.

The paid field is a boolean (flag) indicating whether the data processing server 50 has received from the store terminal 30 a signal indicating that payment was completed when payment is by cash, and whether processing a credit card payment has been completed by the data processing server 50 (server control unit 56) when payment is by credit card.

The kitchen instructions printed field is a boolean (flag) indicating whether the data processing server 50 (kitchen printer control unit 53) has issued a kitchen instruction receipt print command to the kitchen printer 40.

The order delivered field is a boolean (flag) indicating whether the data processing server 50 has received from the store terminal 30 a signal that the products have been delivered to the customer and the order has thus been completed.

This received order data table is not limited to the foregoing fields, and could contain other information such as the price of each product (item) and the total amount of the order.

The data processing tables stored by the file server 60 are described next with reference to FIG. 4. FIG. 4A shows the data input terminal-mobile printer pairing table (pairing information) mentioned above. This table stores a terminal ID for every data input terminal 10 in the product sales system 1, and the logical printer name (printer ID) of the mobile printer 20 used by a particular for output. In this preferred embodiment of the invention each data input terminal 10 and mobile printer 20 are linked 1:1 in predefined pairs.

Fixed pairing information can be thus defined and stored because each operator carries a predefined combination of data input terminal 10 and mobile printer 20.

Based on the terminal ID of the data input terminal 10 that was added to the information sent from the data input terminal 10 to the data processing server 50, the data processing server 50 references the pairing information in the terminal-printer table (see FIG. 4A) to find the printer ID of the mobile printer 20 paired with that data input terminal 10. The data processing server 50 then adds that printer ID to the print data, and sends the print data to that mobile printer 20.

When a mobile printer 20 receives print data from the data processing server 50 through the receiving unit 23, the mobile printer control unit 24 compares the printer ID in the received information with the printer ID stored in the mobile printer's storage unit 22. If the received printer ID matches the mobile printer's own printer ID, the control unit 24 tells the printing unit 21 to print the print data in the received information. If the received printer ID does not match the printer ID stored in the printer's storage unit 22, the mobile printer 20 knows that the received information is not addressed to itself, and thus ignores the received print data and does not print.

A complicated communication management function is therefore not required for constantly polling the operating status of the data input terminal 10 and mobile printer 20 and updating the terminal-printer pairing information. In the event a mobile printer 20 or data input terminal 10 malfunctions, the terminal (printer or data input terminal) that did not malfunction can continue to be used by simply updating the pairing information stored in the pairing information storage 513 of the data processing server 50. When a new data input terminal 10 and mobile printer 20 set (pair) is added to the system, the new set can be used by simply adding the pairing information to the pairing information storage 513.

The foregoing also applies to a kitchen printer 40 located in the kitchen. More particularly, operators (cooks) preparing particular dishes typically work at specific locations (stations) in the kitchen, and a particular printer is therefore installed for each operator or station. Rather than using the terminal ID of the data input terminal 10 in this situation, the product table stored in the data processing table storage 612 of the file server 60 is queried, and the server control unit 56 of the data processing server 50 generates an order information ID (an operator ID for the station preparing a particular item) for each particular type of item.

These order information IDs are stored in a table correlating the order information ID to a kitchen printer ID in the pairing information storage 513. This pairing table links the order information ID for a particular product to the printer ID of the kitchen printer 40 located at the station where the item is prepared.

Therefore, similarly to the operation whereby the data processing server 50 sends print data to a particular mobile printer 20, the data processing server 50 queries the pairing information storage 513 to get the printer ID of the particular kitchen printer 40. The data processing server 50 then adds this kitchen printer ID to the print data and then sends the print data to the kitchen printer 40. The kitchen printer 40 with a printer ID matching the printer ID in the print data then prints the information.

The data processing server 50 could also directly control the receipt printer 37 of the store terminal 30. In this case pairing information linking a store terminal 30 ID to the ID of a particular receipt printer 37 is also stored in the pairing information storage 513 of the data processing server 50, and the receipt printer 37 matching the printer ID in the print data prints the information.

If the store terminal 30 controls the receipt printer 37, information pairing a store terminal 30 to a particular receipt printer 37 is not necessary and is therefore not stored in the data processing server 50 or used.

FIG. 4B shows an example of a product table. The fields in this table include a product number, name, and price. This table is overwritten or updated by writing the product table stored in the data processing table storage 612 of the file server 60 in response to a request from the data processing server 50 (server control unit 56).

The product table stored in the data input terminal 10 is rewritten as follows. When an operator goes off duty and is not using the data input terminal 10, the data input terminal 10 is placed in a recharging cradle not shown for recharging. This cradle is connected over the LAN N1 to the data processing server 50. The cradle also has a receiver for receiving and storing updated product table information from the data processing server 50. While the data input terminal 10 is being recharged, the updated product table information is written to the storage medium 130 through a data terminal located near the charging terminals. As a result, when the operator picks up a recharged data input terminal 10 when starting to work, the product table has already been updated in the data input terminal 10.

If the charging cradle does not have means for writing the product table information, the operator could refer to an updated product table and manually enter the information to the storage medium 130 using the key input unit 12, for example.

The store terminal 30 retrieves updated product table information from the data processing server 50 when the store terminal 30 is turned on, and writes the new product table to storage unit 35.

The same product table is thus always used throughout the product sales system 1. When the product table is updated in the data processing server 50 (server control unit 56), the product table is also written to the data input terminal 10 and store terminal 30 each time the product table is updated.

The information stored in the product table shall not be limited to the fields shown in FIG. 4B, and could contain additional information such as a barcode or other product code information, inventory information, and expiration date.

FIG. 4C shows an example of a last order number table. This table stores the terminal ID of every data input terminal 10 and store terminal 30 in the product sales system 1, and the number of the last product order received by each terminal (the last order number).

This last order number table is stored in memory 14, 35 (such as flash ROM) when the data input terminal 10 is not in use (i.e., being recharged) and when the store terminal 30 is turned off. When the data input terminal 10 or store terminal 30 is turned on for use, the last order number table is referenced to determine the next product order number to be used by that terminal.

If a terminal 10, 30 is used infrequently, and is then turned off when no longer needed, storing the last order number used by each terminal 10, 30 in each terminal 10, 30 and the file server 60 assures that when the terminal 10, 30 is used the next time, the last order number assigned by that terminal can be retrieved from memory so that the next sequential number can be assigned to the next order received.

Starting each product order number with the terminal ID (e.g., A, B, and so forth) assures that each terminal will always assign a number that is not also used by a different terminal, and the last order numbers (values) will also be unique to each terminal.

This last order number is also updated when the data processing server 50 receives the received order data sent by the data input terminal 10 or store terminal 30 when an order is completed.

Print forms for the receipts printed by the printer terminals (mobile printer 20, receipt printer 37, and kitchen printer 40) are described next with reference to FIG. 5 and FIG. 6.

Each print form includes constant information and variable information.

The constant information is recorded as text information printed to a predetermined location on each receipt, and could include image information. The constant information is stored as a template including bitmapped image data reflecting the predetermined character size, text color, format, lines, symbols, logo, background image, and the locations of these components in the receipt.

The variable information is printed to a specific part of each receipt, and changes based on information received by the data processing server 50 from the terminals. The variable information includes information that changes according to the received order information, such as a barcode and text information such as the products and prices, and is stored with the character size, color, format, and other information used to merge the variable information with the template.

FIG. 5A shows a print form for a credit card payment receipt R1, which is printed by the mobile printer 20 or receipt printer 37 when a credit card is used for payment. The constant and variable information printed on this credit card payment receipt R1 includes the date the credit card was used, specific card information (such as the credit card company, credit card number, and expiration date), and payment method, the store name, payment amount (transaction amount), and a signature line. The payment method, either single or multiple payments, is determined based on information indicating the payment method selected by the credit card user and entered to the data input terminal 10 or store terminal 30.

FIG. 5B shows a print form for a credit card rejection slip R2, which is printed by the mobile printer 20 or receipt printer 37 when payment by credit card is selected by the customer but the card is rejected and cannot be used. The constant and variable information printed on this credit card rejection slip R2 include the date the credit card was used, specific card information (such as the credit card company, credit card number, and expiration date), and a rejection line, which could include the reason why the charge or card was rejected. Note that this credit card rejection slip R2 may be printed because the card was rejected by the card authorization server as invalid, because the charge amount exceeds the credit card limit, or because the magnetic stripe on the card was unreadable, for example.

FIG. 6A shows an example of a print form for a product order receipt R3 printed by the mobile printer 20. The information in this print form includes a store name logo (ABC Food in this example), the receipt name (customer order receipt), the order date (date issued), product order number, barcode, payment method, order content (the number, name, and count of the each product ordered, the unit price or total for each ordered product, and the total amount of the order), and whether payment was received.

The barcode records such information as the order date, product order number, and receipt number.

Because cash payment is not received at the data input terminal 10 in this embodiment of the invention, the payment received line indicates "Payment: pending" if the customer is paying with cash. If paying by credit card and the credit card is charged, the payment received line indicates "Payment: paid."

The product order receipt R3 could also include instructions for the customer. For example, if the customer is paying by cash, the receipt could state: "Please pay for and receive your order at the cash register." If the customer paid by credit card, the receipt could state: "Your order has been sent to the kitchen. Please pick up your order at the Pick-Up window."

FIG. 6B shows a print form for a kitchen instruction receipt R4 printed by the kitchen printer 40. The information in this receipt includes the receipt name (kitchen order receipt), order date (and possibly time), product order number, and order content (the number, name, and count of the each product ordered, and optional preparation instructions). This kitchen instruction receipt R4 is output after payment, by either cash or credit card, is completed, or more specifically when the data processing server 50 receives a signal from the data input terminal 10 or store terminal 30 indicating that payment was completed. If the order is received by the data input terminal 10 and payment is by cash, the data input terminal 10 does not send a payment received signal to the data processing server 50. The kitchen staff then prepares the order according to the instructions on the kitchen instruction receipt R4.

The processes run by the terminals in a product sales system 1 according to the present invention are described next with reference to the flow charts in FIG. 7 to FIG. 13.

Figure 7:
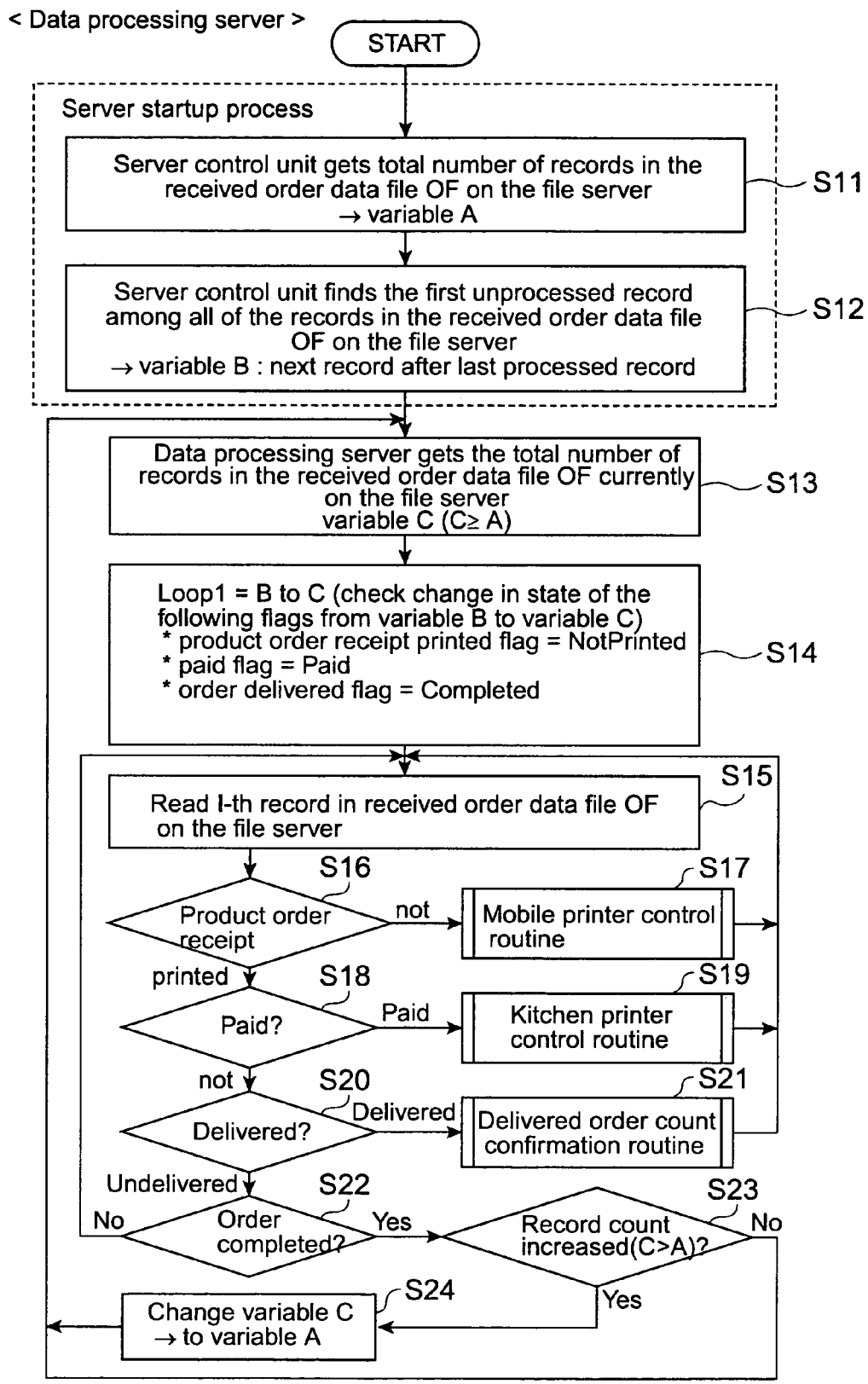
FIG. 7 is a flow chart showing the process run by the data processing server.
Figure 8:
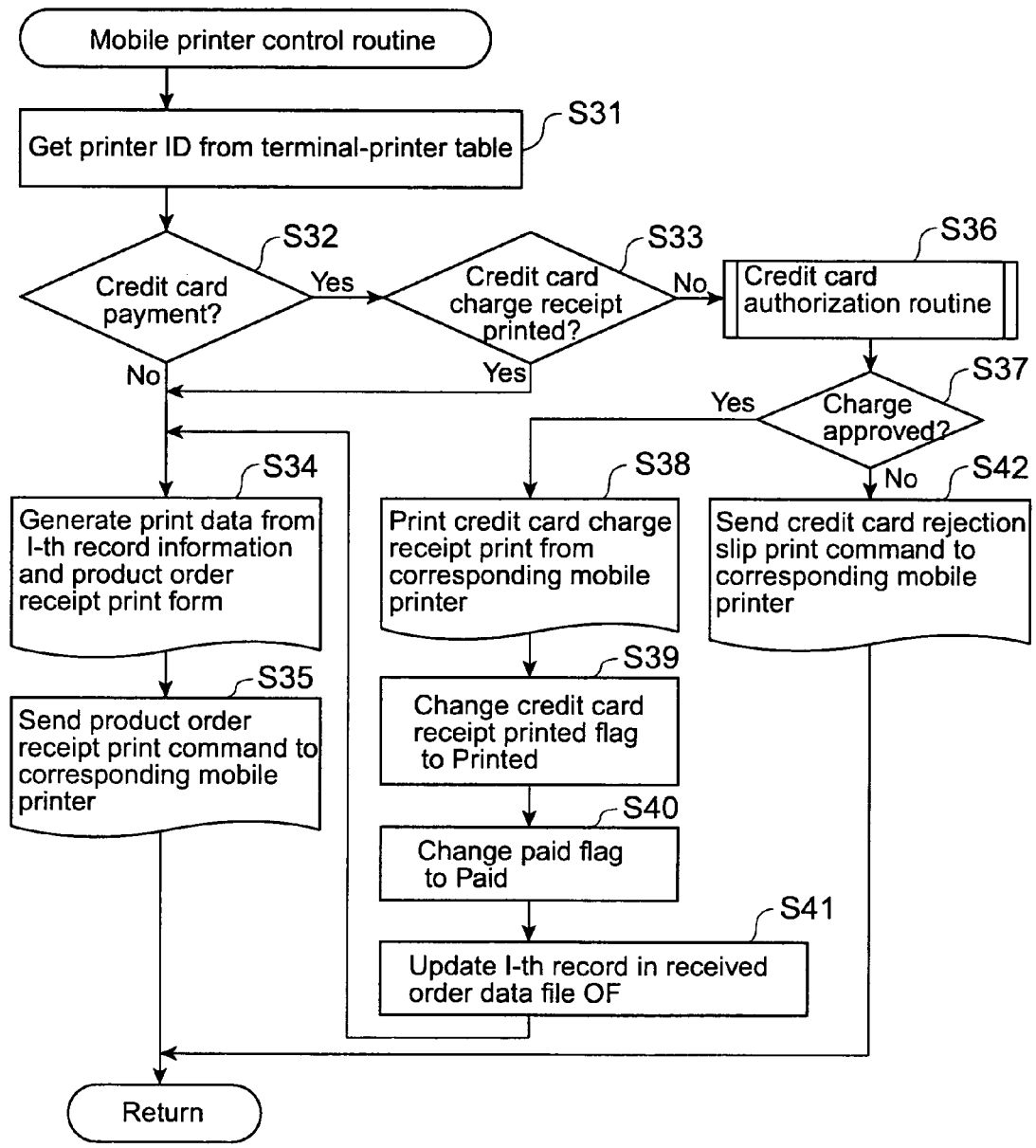
FIG. 8 shows a subroutine of the process shown in FIG. 7.
Figure 9:
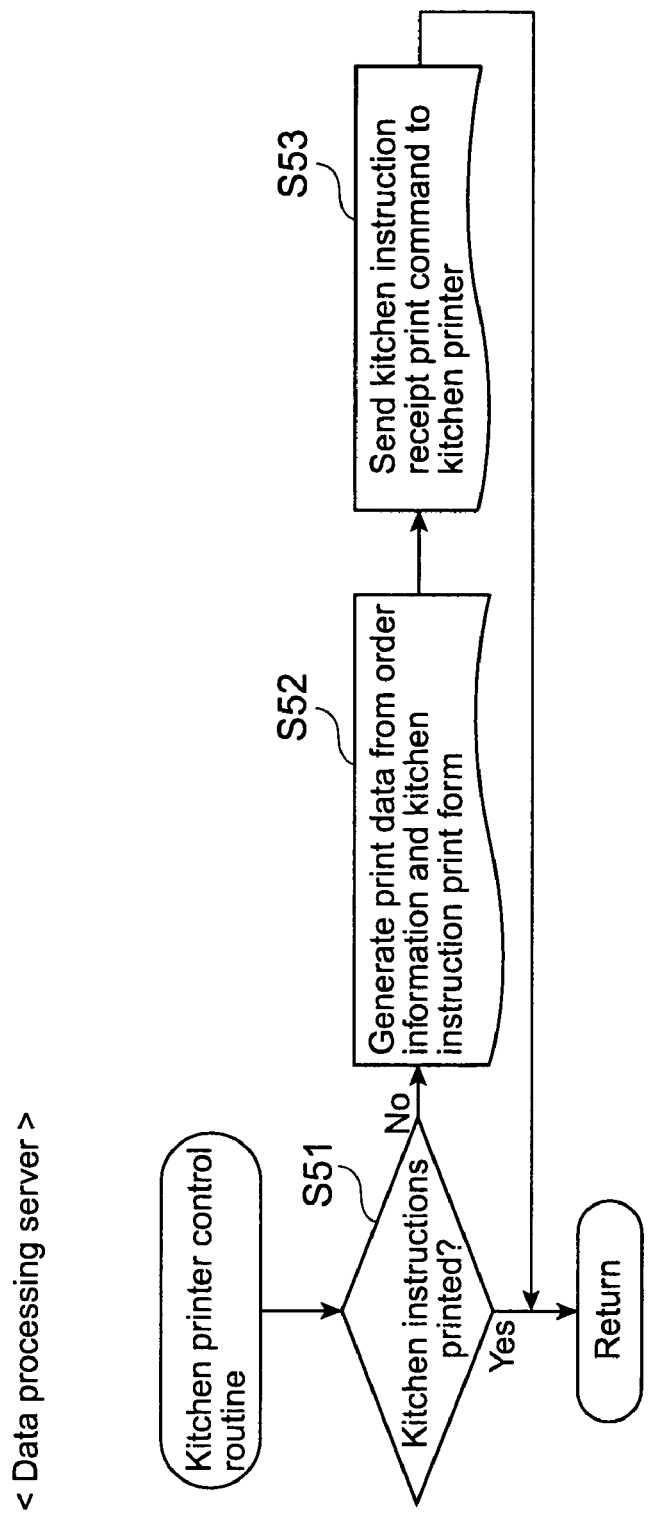
FIG. 9 shows a subroutine of the process shown in FIG. 7.

FIG. 7 is a flow chart of the process run by the data processing server 50, and FIGS. 8, 9 and 10, are subroutines of the process shown in FIG. 7.

Figure 11:
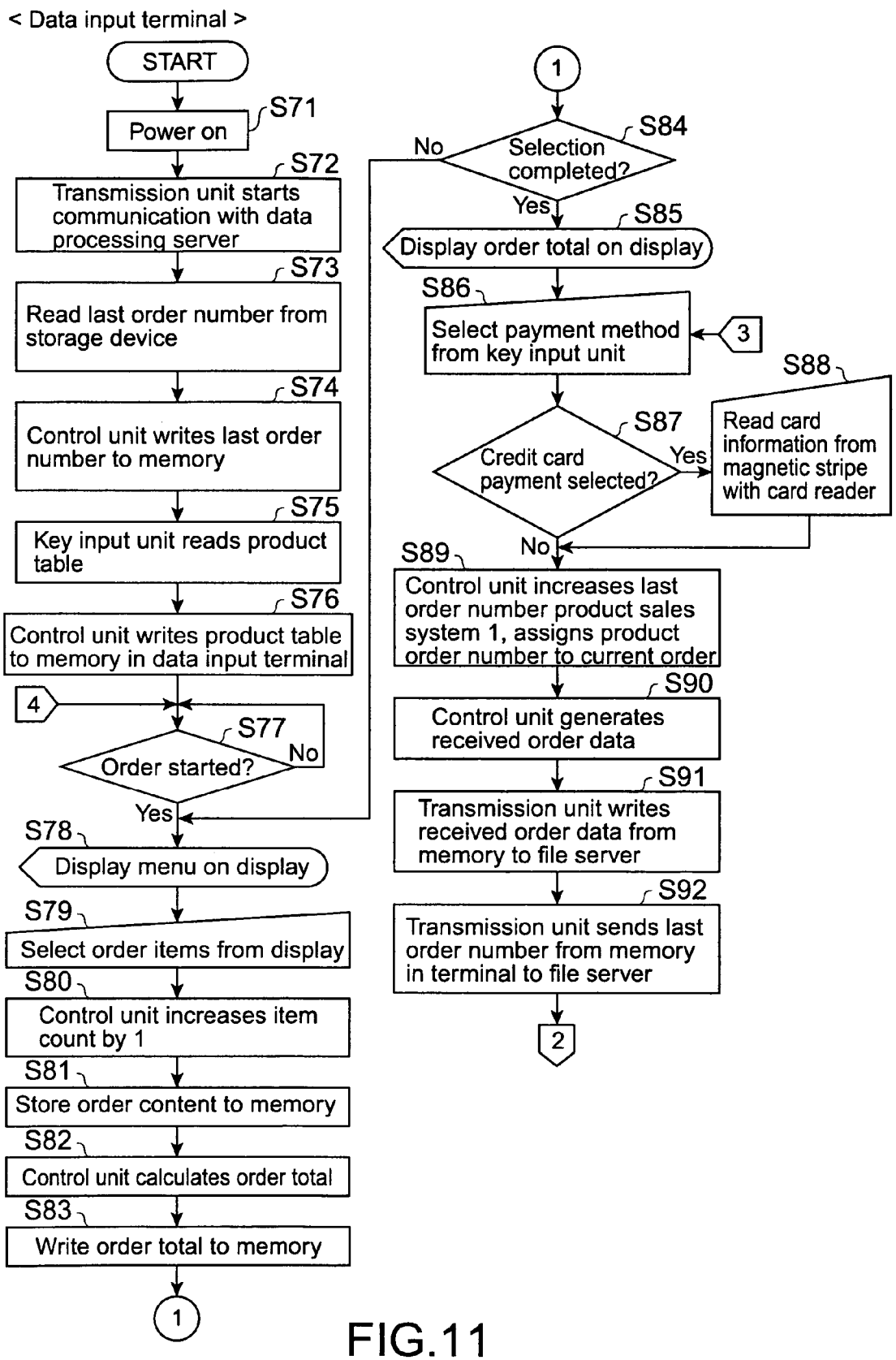
FIGS. 11 and 12 is a flow chart of the process run by the data input terminal.
Figure 12:
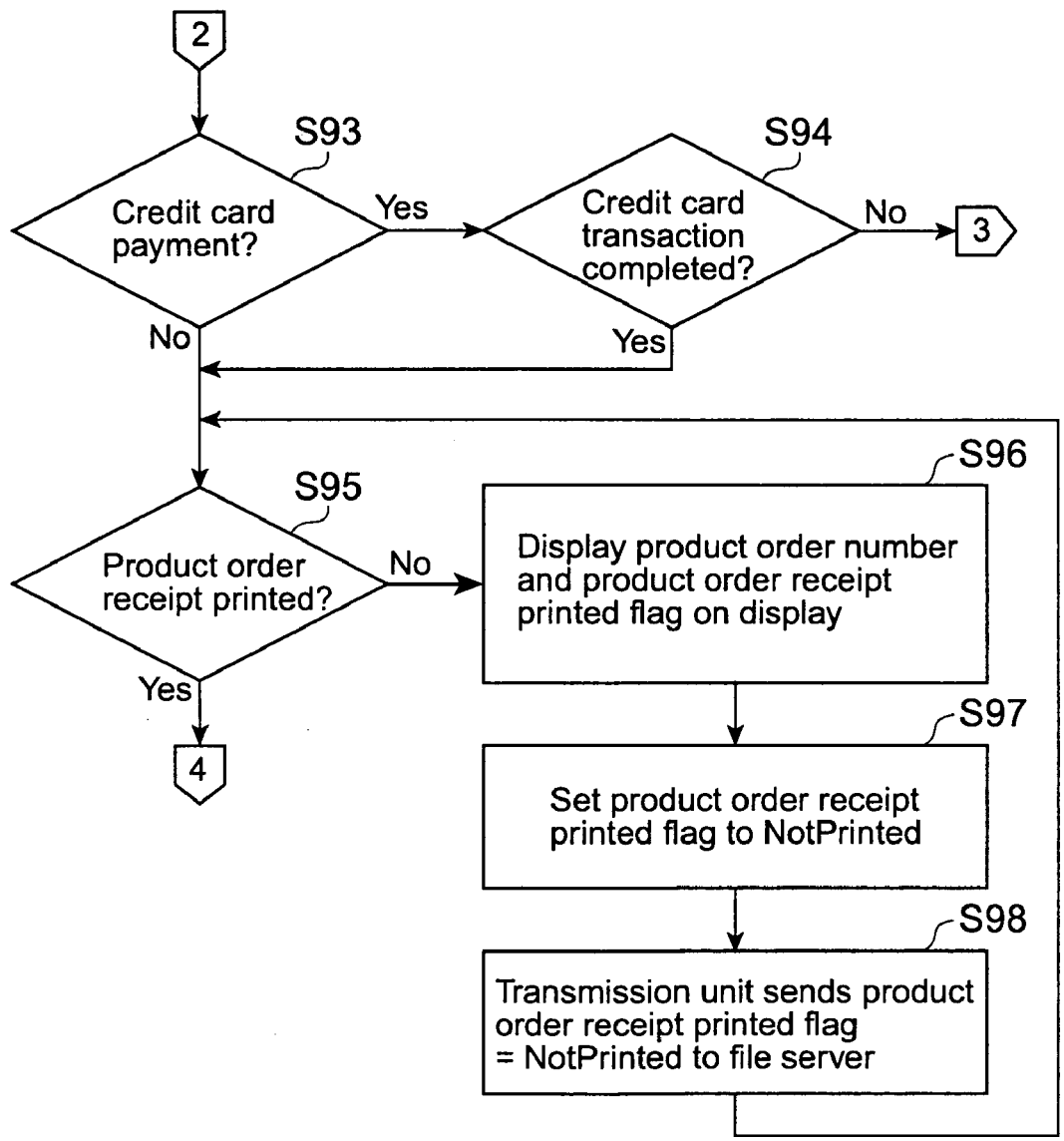

A flow chart of the process run by the data input terminal 10 is shown in FIGS. 11 and 12.

Figure 13:
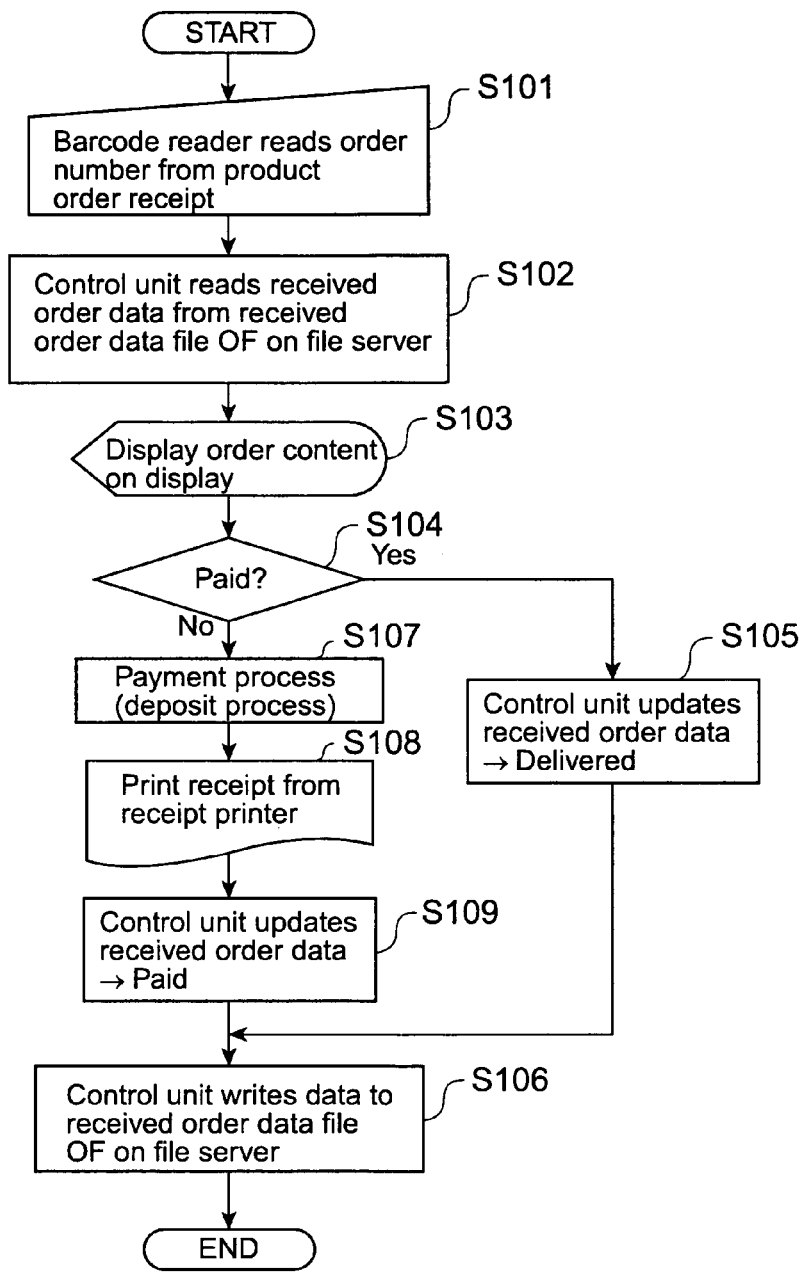
FIG. 13 is a flow chart of the process run by the store terminal.

FIG. 13 is a flow chart of the process run by the store terminal 30.

The process run by the data processing server 50 is described first.

As shown in FIG. 7, when the data processing server 50 starts (the power turns on), the server control unit 56 gets the total number of records in the current received order data file OF (see FIG. 3) stored in the file server 60 (S11). This record count is written to variable A.

The server control unit 56 then finds the first unprocessed record among all of the records in the received order data file OF currently on the file server 60 (S12). The record number of the first unprocessed record found in the received order data file OF, that is, the record number of the next record after the last received record that has been processed, is written to variable B.

These steps S11 and S12 complete the server startup process. After startup, the server continuously loops through steps S13 to S24 described below until the server is shut down.

When the startup process ends, the data processing server 50 again gets the total number of records in the received order data file OF currently stored on the file server 60 (S13). This record count is written to variable C. Because variable C=A immediately after startup, this step could be omitted.

Change in any of the record flags is then checked for each of the records from variable B to variable C in the received order data file OF (Loop 1=B to C, S14). More specifically, steps S16 to S21 detect whether the product_order_receipt_printed flag is set to NotPrinted (see S97 in FIG. 12), whether the paid flag is set to Paid (see S40 in FIG. 8 and S109 in FIG. 13), and whether the order_delivered flag is set to Completed (see S105 in FIG. 13).

More specifically, the I-th record in the received order data file OF on the file server 60 is read (S15), and if the product_order_receipt_printed flag is set to NotPrinted (S16 returns NotPrinted), the mobile printer control routine shown in FIG. 8 runs (S17).

If the paid flag of the I-th record indicates that payment was completed (S18 returns paid), the kitchen printer control routine shown in FIG. 9 runs (S19).

Figures 10A, 10B:
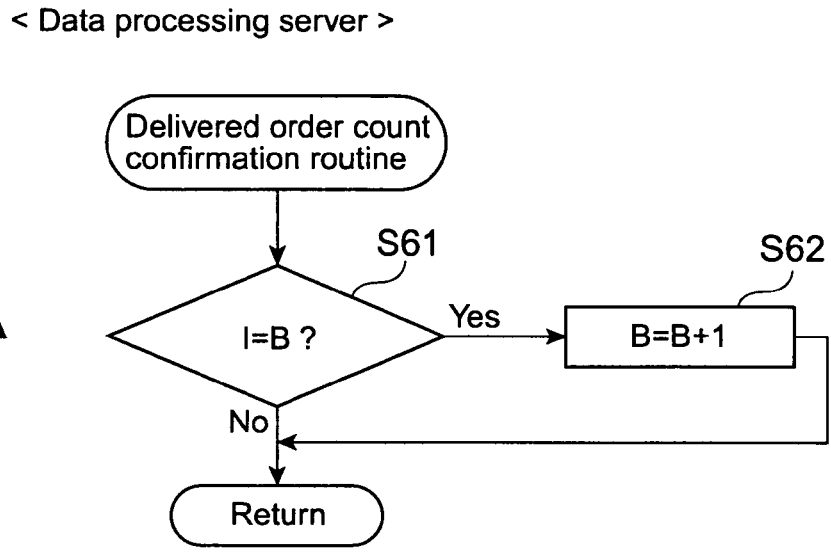
FIG. 10 shows a subroutine of the process shown in FIG. 7.

If the order_delivered flag indicates that the order has been delivered to the customer (S20 returns Delivered), the delivered order count confirmation routine shown in FIG. 10A runs (S21).

If the order_delivered flag for the B-th record is Undelivered (S20 returns Undelivered) but the I-th record was completed (when the state of none of the flags has changed, that is, when the order_delivered flag is set to Delivered; S22 returns yes), step S23 determines if the record count of the received order data file OF on the file server 60 has increased in conjunction with the receipt of information from the data input terminal 10 or store terminal 30.

If the record count has increased (C>A; S23 returns yes), variable A is updated to the new value of variable C (S24). The procedure then loops back to check for change in the state of any flag in any of the records from variable B to the new variable C value (that is, the process repeats from S13).

If the record count has not increased (that is, C=A and S23 returns no), the procedure repeats from step S13 without changing the value of variable C.

The mobile printer control routine executed as step S17 shown in FIG. 7 is described next with reference to the flow chart shown in FIG. 8. It is assumed below that the I-th record is based on data entry to the data input terminal 10.

As described above, when the I-th record in the received order data file OF is read and the product_order_receipt_printed flag is set to NotPrinted (S16 returns NotPrinted), the printer ID of the corresponding mobile printer 20 is acquired from the terminal-printer table (FIG. 4A) (S31).

Whether the payment method (see FIG. 3) in the I-th record is set to credit card payment is then checked (S32). If credit card payment was selected (S32 returns yes), whether the credit_card_receipt_printed flag (see FIG. 3) is set to Printed is checked (S33). If the credit_card_receipt_printed flag is set to Printed (S33 returns yes), the mobile printer control unit 52 reads the product order receipt print form (FIG. 6A) and generates print data for printing a product order receipt R3 based on the received order data of the I-th record (S34). The printer ID is then inserted to the header of the print data and the print data (command) is sent to the corresponding mobile printer 20. The mobile printer 20 thus prints the product order receipt R3 (S35) and this routine ends.

If the credit_card_receipt_printed flag in the I-th record is set to NotPrinted (S33 returns no), the server control unit 56 sends the card information (credit card number) to the authorization server 70 for a card authorization check (S36).

If the credit card is authorized for use (S37 returns yes), the mobile printer control unit 52 reads the credit card payment receipt print form (see FIG. 5A), generates print data for printing a credit card payment receipt R1 based on the I-th record information (including the credit card number), adds the printer ID to the header of the print data, sends the print data (command) to the corresponding mobile printer 20, and thus prints a credit card payment receipt R1 (S38).

The server control unit 56 also changes the credit_card_receipt_printed flag of the I-th record to Printed (S39), and changes the paid flag to Paid (S40).

The server control unit 56 then updates the I-th record in the received order data file OF to reflect these changes (S41), and the routine ends.

If the authorization server 70 rejects using the card and the card is thus not authorized (S37 returns no), the mobile printer control unit 52 reads the credit card rejection slip R2 print form (FIG. 5B), generates print data for printing a credit card rejection slip R2 based on the credit card number and other information in the I-th record, adds the printer ID to the header of the print data, and sends the print data command to the corresponding mobile printer 20. The mobile printer 20 thus prints the credit card rejection slip R2 (S42), and this routine ends.

The kitchen printer control routine shown as step S19 in FIG. 7 is described next with reference to the flow chart in FIG. 9.

When the paid flag read from the I-th record in the received order data file OF is set to Paid (S18 in FIG. 7 returns Paid), the kitchen_instructions_printed flag (see FIG. 3) is also read from the received order data file OF to determine if a print command was sent to the kitchen printer 40 (S51). If the kitchen_instructions_printed flag is set to Printed (S51 returns yes), the kitchen printer control routine ends.

If the kitchen_instructions_printed flag is set to NotPrinted (S51 returns no), the kitchen printer control unit 53 reads the kitchen instructions print form (FIG. 6B), and generates print data for printing a kitchen instruction receipt R4 based on the product order number and other information in the I-th record (S52). The kitchen printer control unit 53 then sends the print data and command to the kitchen printer 40 to print the kitchen instruction receipt R4 (S53), and this control routine ends.

It will be apparent that a table correlating product order IDs to kitchen printer IDs could be compiled as described above when there are multiple kitchen printers. In this case, the kitchen printer ID for the kitchen printer linked to a particular product order ID is added to the print data header to address the print data to a particular kitchen printer similarly to the method of addressing print data to a particular mobile printer 20.

The delivered order count confirmation routine executed as step S21 in FIG. 7 is described next with reference to the flow chart in FIG. 10A.

If the order_delivered flag read from the I-th record in the received order data file OF indicates that the order has been delivered to the customer (S20 returns Delivered), whether the I-th record number equals variable B is determined (S61). This step determines if the delivery process has been completed. If the I-th record number equals B (I=B) (S61 returns yes), variable B is incremented one (S62) and the routine ends. However, if the I-th record number does not equal B (S61 returns no), this routine ends without incrementing B.

This is described more fully using the example shown in FIG. 10B. If the order_delivered flag for the third record is set to Undelivered and is then changed to Delivered, the value of variable B is incremented 1 so that B=4. As shown in this example, the sixth record is also set to Delivered, but the fifth record is Undelivered. The delivery process has thus not been completed for each of the preceding consecutive records (S61 returns no), and variable B is therefore not set to 6 until processing the fifth record is finished. Processing errors are thus prevented because variable B is not incremented unless all records before the I-th record being processed have been processed and delivered.

The process run by the data input terminal 10 is described next with reference to FIG. 11 and FIG. 12.

When the data input terminal 10 is not being used, it is set into a charging cradle as described above. When the data input terminal 10 is removed from the cradle for use and the power is turned on (S71), the data input terminal 10 is initialized, which includes resetting flags in the storage device 14, and the transmission unit 15 then sends the terminal ID of the data input terminal 10 and information enabling the start of communication to the data processing server 50 (S72). Variable information such as the last order number processed by that data input terminal 10 and saved to flash ROM or other nonvolatile storage device 14 is then read (S73) and written to working RAM or other storage device 14 by the control unit 16 (S74).

When the operator finishes using a data input terminal 10 and turns the power off or sets the data input terminal 10 in the cradle for recharging, the last order number used by the terminal is saved from volatile RAM to flash ROM or other nonvolatile memory in the storage device 14. Other variable information may also be saved by the control unit 16 to nonvolatile storage.

Furthermore, if the product table (FIG. 4B) stored in the database DB of the file server 60 has been updated and must be updated in the data input terminal 10, the product information to be updated is read when the appropriate key on the key input unit 12 of the data input terminal 10 is operated (S75), and the control unit 16 writes the updated product table to the storage device 14 (S76).

If the cradle has the ability to write the updated product table information to the data input terminal 10, the product table is written to the data input terminal 10 while the terminal is being charged as described above. Key operation is therefore not needed in this case to update the product table.

Step S77 then waits for order entry to start. When the operator starts entering data to the key input unit 12 such as by pressing a New Order key (S77 returns yes), an order menu is presented on the display device 13 based on the product table stored in storage device 14 (S78), and the ordered items are selected from the menu (product information is entered) using the key input unit 12 (S79). When a menu item is selected, the number of items (FIG. 3) is initially set to one (S80) and the order content (product information) is written to storage device 14 (S81). The order total is also calculated by the control unit 16 (S82) and written to storage device 14 (S83). Note that when the first item is entered, the order total is initially set to the unit price of the first ordered item if only one of that item is ordered.

When item selection is completed (S84 returns yes), the order total is displayed on the display device 13 (S85), and the payment method is selected using the key input unit 12 (S86). If payment by credit card is selected (S87 returns yes), the credit card information, particularly the credit card number, is read from the magnetic stripe by the magnetic card reader 11 (S88).

The control unit 16 then generates a product order number for the order generated in steps S77 to S84 by incrementing the last order number stored in the storage device 14 (S89). The control unit 16 then generates the received order data based on the information entered in steps S77 to S88 for writing a record in the received order data file OF (S90), and writes this received order data to storage device 14.

The same received order data is also sent by the transmission unit 15 to the file server 60 and is written to the received order data file OF stored on the file server 60 (S91). The last order number is also written to the last order number table (FIG. 4C) (S92).

When payment by credit card is selected in step S86 in FIG. 11, step S93 in FIG. 12 returns yes, and step S94 determines if payment by credit card has been completed (if the credit card charge has been authorized by the authorization server 70). If the credit card is rejected (such as because the charge would exceed the credit card limit) (S94 returns no), the control unit 16 decrements the last order number saved in the storage device 14 by one, and control returns to step S86 in FIG. 11 for the payment method to be selected again. In this case the customer can use a different credit card or decide to pay by cash.

If credit card processing and payment is completed (S94 returns yes), the operator confirms whether the mobile printer 20 has finished printing the product order receipt R3 (FIG. 6A) (S95). If printing has ended (S95 returns yes), the process returns to step S77 in FIG. 11 and waits for the start of the next new order. Return to step S77 could occur automatically when step S95 returns yes, or could wait for the operator to press a reset key or other key on the key input unit 12.

If printing the product order receipt R3 has not finished, the mobile printer 20 is known to not be printing even though the operator using the mobile printer 20 has entered the necessary information (S95 returns no). Therefore, when the operator presses a particular key on the key input unit 12, the product order number and product_order_receipt_printed flag for the product order receipt R3 that has not printed are displayed on the display device 13 (S96). When a specific key is then pressed, the product_order_receipt_printed flag is set to Not-Printed (S97). The control unit 16 then sends the product order number of the product order receipt R3 that has not printed and the NotPrinted state of the product_order_receipt_printed flag to the data processing server 50 by means of the transmission unit 15 (S98). The data processing server 50 thus knows that the product order receipt R3 did not print, and waits for the mobile printer 20 to print the product order receipt R3.

When the product order receipt R3 is printed, the same basic steps execute except that the product_order_receipt_printed flag is set to Printed when the information is sent to the data processing server 50.

If the receipt has not printed due to a printer error, such as there being no paper in the mobile printer 20, the data processing server 50 can know that a printer error occurred by sending a printer error flag instead of the product_order_receipt_printed flag to the data processing server 50. After the operator loads paper and the mobile printer 20 prints the product order receipt R3, the printer error flag can be cancelled, and the product_order_receipt_printed flag set to Printed and then sent to the data processing server 50.

The data input terminal 10 calculates and displays the order total on the display device 13 in the process described above, but this could be omitted. In this case, the operator and customer can know what the order total (payment amount) is from the product order receipt R3 printed by the mobile printer 20. This configuration simplifies the control process executed by the data input terminal 10.

The step in which the operator confirms whether the product order receipt R3 was printed by the mobile printer 20 (S95) could also be omitted. More specifically, writing the received order data to the received order data file OF in the file server 60 (S91) could be used as confirmation that the product order receipt R3 was printed, and steps S95 to S98 could thus be omitted. This eliminates the need for the operator to confirm that the product order receipt R3 printed.

The process executed by the store terminal 30 is described next with reference to FIG. 13. Processing an order received (entered) by the data input terminal 10 is described below. This includes processing an order to be paid for by cash, and delivering the products to the customer. As described briefly above, when a customer selects to pay in cash for an order taken by an operator using a data input terminal 10 and mobile printer 20, the customer receives the product order receipt R3 printed by the mobile printer 20 and proceeds to the checkout register where the cash payment is processed by the store terminal 30 and the order is then delivered to the customer.

The barcode printed on the product order receipt R3 presented at the store terminal 30 by the customer is read using a barcode reader 32 (S101) to acquire the product order number. The control unit 38 then reads the received order data based on the product order number from the received order data file OF stored on the file server 60 (S102).

After the received order data is read, the order content (product information) is displayed on the display device 34 (S103), and the operator can thus know if payment has been completed (S104).

Whether payment has been received can be determined by checking the state of the paid flag contained in the received order data. If the paid flag is set to Paid (such as when payment by credit card was completed at the data input terminal 10, or cash payment was completed at the store terminal 30 before this process; S104 returns yes), the control unit 38 updates the received order data (changes the order_delivered flag to Completed, S105). After updating the order_delivered flag, the control unit 38 sends the updated order_delivered flag status to the file server 60 for writing to the received order data file OF stored in the file server 60 (S106). This process then ends.

If payment for the order has not been completed (S104 returns no), the cash payment process (deposit process) runs (S107). If the order was received at the store terminal 30, payment by credit card is also possible. Based on the result of the payment process, the control unit 38 generates print data for a receipt and prints the receipt (not shown) from the receipt printer 37 (S108). The control unit 38 then updates the received order data (changes the paid flag to Paid, S109), sends the updated received order data to the file server 60 and writes the updated data to the received order data file OF on the file server 60 (S106). This process then ends.

The store terminal 30 is described above as being able to execute the entire process from receiving an order (order entry) to payment (by cash or credit card), and processing product delivery to the customer. However, when the store is busy, for example, all orders could be entered only at the data input terminals 10 and the store terminal 30 could be limited to processing cash payments and product delivery. Furthermore, when the product sales system 1 has multiple store terminals 30, different store terminals 30 could be used for taking cash payments and for handling product delivery to the customer. In this case, however, orders are only entered from the data input terminals 10, and when the data input terminal 10 prints a product order receipt R3 marked unpaid (see FIG. 6A), the store terminal 30 where cash payments are processed prints another product order receipt R3 marked paid.

The data processing server 50 in a system according to the present invention thus controls all printing operations by the mobile printers 20 and kitchen printers 40. The data input terminal 10 therefore only needs to send instructions (send input data), and does not need to control printing by the mobile printer 20.

The data processing server 50 therefore only needs a reception function for receiving data from the data input terminal 10 and does not require a complicated communication function to communicate with the data input terminals 10. Yet further, the data processing server 50 only needs a transmission function for sending data to the mobile printer 20 and kitchen printer 40, and thus does not require a complicated communication function to communicate with the printers.

The communication control process executed by each terminal in a product sales system 1 according to the present invention can thus be simplified.

Furthermore, because a data input terminal 10 and mobile printer 20 set is only used by a single operator at any one time, the data input terminals 10 and mobile printers 20 can be assembled in sets with a known, predefined 1:1 pairing, and communication with each device is simplified as a result of these pairings.

This pairing information particularly simplifies wireless communication control because the data processing server 50 does not need to determine the operating status of the data input terminal 10 and mobile printer 20 or kitchen printer 40, and manage communication control while analyzing the input terminal ID or the output terminal ID that is added to the communication data.

Yet further, the data processing server 50 only requires a one-way input module and output module to communicate with the data input terminal 10 and mobile printer 20, thus enabling even easier communication control. A low cost, simple network can thus be constructed.

Furthermore, because print forms for the printout produced by the mobile printer 20 and kitchen printer 40 are stored in the file server 60 and referenced to generate the print data, the data input terminal 10 and mobile printer 20 do not need to store the print forms internally.

Yet further, the data input terminal 10 only needs to send the information to be printed to the print form to the data processing server 50, and does not need to generate the print data or send information identifying the print form to be used. The control process can thus be further simplified.

The data input terminal 10 can also be used as a simple POS terminal because a credit card transaction processing capability is built in to the data input terminal 10. To process a payment by credit card, the data input terminal 10 gets the product information and credit card information, and only needs to send this information to the data processing server 50 as the credit card transaction information. The data input terminal 10 does not need to process the credit card authorization, or control printing the card authorization result on the mobile printer 20. As a result, control processing by the data input terminal 10 is minimally increased even when a credit card transaction processing function is provided in the data input terminal 10.

Furthermore, because the data processing server 50 receives and stores the credit card transaction information in the received order data file OF, inventory management and sale processing can be handled in real time.

In order to eliminate the need for the data input terminal 10 operator to handle cash, the data input terminal 10 in this preferred embodiment of the invention does not process cash payments. If the customer wants to pay by cash, the order can be entered at the data input terminal 10 and the customer then pays at the store terminal 30. As a result, even customers that place an order at the data input terminal 10 can select the desired payment method.

Furthermore, because the data processing server 50 receives and stores the order information together with the payment information to the received order data file OF whether the payment method is by credit card or cash, real-time inventory management and sale management are possible even with orders paid for by cash.

The customer also does not need to tell the operator of the store terminal 30 that an order was already placed or that the customer wants to pay by cash. More particularly, the customer can simply present the product order receipt R3 printed from the mobile printer 20 and quickly complete payment by cash.

The ordered product is also only delivered to the customer after confirming that payment was completed, thus preventing forgetting to collect payment from the customer.

As described above, a product sales system 1 according to the present invention functionally separates the order receiving and credit card transaction processing terminal (data input terminal 10) and the cash transaction terminal (store terminal 30). As a result, in sales environments such as fast-food stores where the busy sales times are predictable and a drop in productivity and efficiency can result from the time required to place orders when the store is busy, multiple data input terminal 10 and mobile printer 20 sets can be made available at low cost to prevent problems caused by a drop in efficiency. Additional sets can be added to the system 1 by simply adding ID information for the new components 10, 20 of the set to the pairing information storage 513 of the data processing server 50.

Yet further, customers can input orders and pay for an order by credit card using a data input terminal 10 and mobile printer 20 set that is added to the system when the store is busy. In addition, the order is sent to the kitchen as soon as the payment is processed so that the kitchen staff can begin preparing the order quickly, and the customer can simply present the printed product order receipt R3 at the store terminal 30 and thus quickly receive the order. Furthermore, because orders are sent to the kitchen only after payment is completed, orders will not be mistakenly delivered to customers that place an order and then do not pay by cash.

A second embodiment of the present invention is described next with reference to FIG. 14. In this embodiment of the invention a coupon issuing function for printing a coupon dependent upon the amount of the purchased goods, for example, is added to the product sales system 1 according to the first embodiment described above. The data processing server 50 determines whether to issue a coupon, and based on the result of this determination controls the mobile printer 20 to print a coupon. This second embodiment is described below with particular attention to the differences from the preceding first embodiment.

Figure 14:
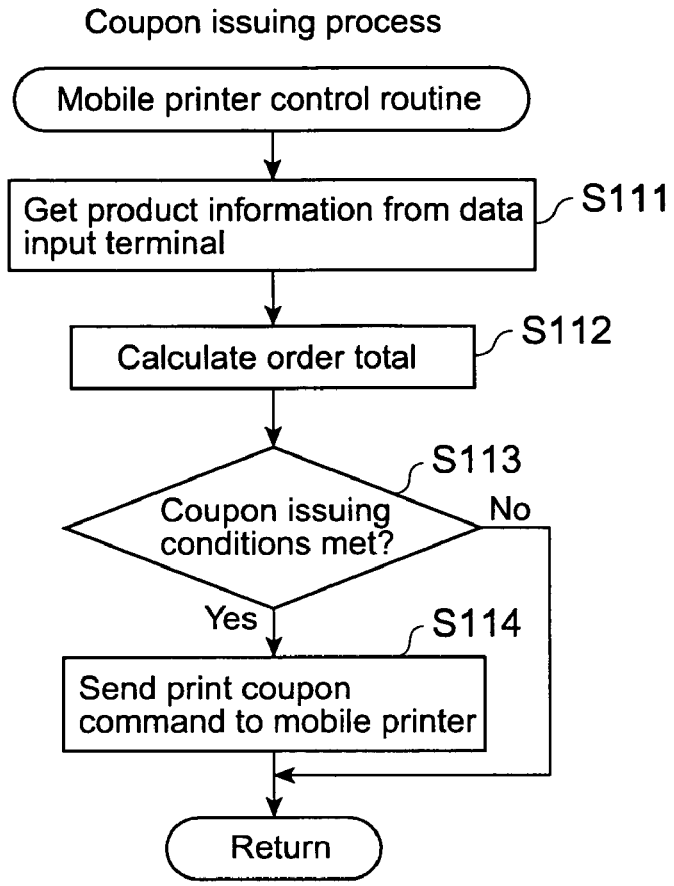
FIG. 14 is a flow chart used to describe a second embodiment of the present invention.

FIG. 14 is a flow chart of the routine whereby the data processing server 50 controls the mobile printer 20 to print a coupon.

When the product information (product number, quantity ordered, and price, for example) for the ordered products from the data input terminal 10 is received by the data processing server 50 (S111), the data processing server 50 calculates the order total (S112), and then determines if the order total meets the condition for issuing a coupon (S113). In this embodiment of the invention a coupon is issued when the order total exceeds a predetermined amount.

If the conditions for issuing a coupon are met (S113 returns yes), a specific print form stored in the file server 60 is read and the print data is generated and sent to the mobile printer 20 as a coupon print command (S114).

If the conditions for issuing a coupon are not met (S113 returns no), the process ends without generating print data for issuing a coupon.

Because the data processing server 50 thus determines whether to issue a coupon based on the input data received from the data input terminal 10, the data input terminal 10 does not need to determine whether to print a coupon, and does not need to issue a print command or generate print data based on the result of this decision. The control process run by the data input terminal 10 is thus simplified.

Because special processing functions are thus not required, a low cost, general purpose data input terminal 10 having only the minimum required data input and data transmission functions can be provided.

The conditions for issuing a coupon shall also not be limited to the total order amount. Coupons could be issued based on whether a purchased product is designated as a product for issuing a coupon, for example. Alternatively, if a function for issuing points to a preferred customer card is provided, the card could be read by the magnetic card reader 11 of the data input terminal 10 and a coupon issued based on the accumulated point total.

Instead of issuing a coupon based on product information received from the data input terminal 10, an item other than a coupon could alternatively be printed based on other input data from the data input terminal 10. For example, a credit card payment receipt R1 is printed by the mobile printer 20 in the first embodiment above when a credit card payment is processed and the credit card is authorized, but a credit card rejection slip R2 is printed when the card is rejected. This embodiment of the invention could be applied, however, so that nothing is printed when the credit card is rejected.

More specifically, the data processing server 50 could verify the credit card based on the card information received from the data input terminal 10, and determine based on the card authorization result whether to issue a credit card charge slip. The operator can know that the credit card cannot be used because a charge slip is not printed even though the data was entered. By thus not issuing a credit card rejection slip R2 when the credit card cannot be charged, receipt paper consumption is reduced and resources can be conserved.

A third embodiment of the present invention is a variation of the foregoing second embodiment. As described above, the data processing server 50 determines whether to print a particular form (a coupon in this example) based on input data received from the data input terminal 10. This third embodiment differs from the second embodiment in enabling, based on the input data received from the data input terminal 10, selecting which of multiple print forms for multiple objects (coupons) stored in the data processing server 50 is to be referenced for printing. The differences between this embodiment and the foregoing second embodiment are described briefly below.

For example, there might be three different coupons for 100 yen, 500 yen, and 1000 yen with a different print form for each coupon stored on the data processing server 50 (file server 60). When the product information input to the data input terminal 10 is received in this case, the data processing server 50 calculates the order total for the purchased goods, and decides which coupon to print based on the order total. For example, if the total purchase is for 1000 yen or more and less than 5000 yen, the data processing server 50 reads and prints a coupon based on the print form for the 100 yen coupon; if the total purchase is for 5000 yen or more and less than 10,000 yen, the print form for the 500 yen coupon is used; and if the total purchase is for 10,000 yen or more and less than 10,000 yen, the print form for the 1000 yen coupon is used.

By thus storing print forms for generating the coupon print data on the data processing server 50 and referencing a print form and generating the print data based on the input data received from the data input terminal 10, the data input terminal 10 can simply send the input data that is to be printed on the print form to the data processing server 50. The data input terminal 10 does not need to send the print form or send a print form selection command. A data input terminal 10 with minimal data entry and data transmission functions can thus be used even when a variety of different objects are printed according to the input data.

The print forms stored in the data processing server 50 in this embodiment of the invention shall not be limited to print forms for issuing coupons, and could include print forms for printing other objects.

Furthermore, the data processing server 50 shall also not be limited to selecting the print form based on the product information received from the data input terminal 10, and the data processing server 50 could select the print form based on other input data received from the data input terminal 10.

While a network system according to the present invention is described above with reference to a product sales system 1, the invention is not so limited. Rather, the invention could be applied to a variety of warehousing, distribution, and other applications using a network comprising one or more data input terminals used for data entry, one or more data output terminals, and a data processing server where each data output terminal is used paired in a predetermined 1:1 relationship with a specific data input terminal for outputting data based on information input to the corresponding data input terminal, and the data processing server is connected over a network for centrally controlling the data input terminals and data output terminals.

Furthermore, the data input terminal shall not be limited to a commercial PDA that can be used as a simple POS terminal, and could be a PHS or cell phone handset that can connect to the network system. The data input terminal shall also not be limited to a portable terminal, and could be a stationary computer.

The printers used for printing in response to instructions from the data input terminal shall not be limited to mobile printers, and could be large-scale stationary printers (business printers).

The data output terminals of the present invention are also not limited to printers, and could be other types of data output devices, including display devices.

The functions of the data input terminal 10, store terminal 30, mobile printer 20, kitchen printer 40, and data processing server 50 described above can also be provided as a computer-executable program.

Yet further, the present invention is not limited to a system 1 such as described above; the present invention can also be realized as a paired device control method by storing the foregoing program on a storage medium or device not shown. The storage medium for recording the program could be, for example, flash ROM, a memory card (such as Compact Flash card, Smart media, or memory stick), Compact Disc, magneto-optical disk, DVD, or a floppy disk.

Although preferred embodiments of the present invention have been described with reference to the accompanying drawings, various changes and modifications will be apparent to those skilled in the art in light of the foregoing disclosure. Each such change and modification is included as part of the present invention to the extent that it falls within the spirit and scope of the appended claims.

What is claimed is:

1. A network system, comprising:
    a plurality of data input terminals, each data input terminal enabling data entry;
    a plurality of data output terminals, each data output terminal for use in a predetermined one-to-one relationship with a corresponding one of the data input terminals and each data output terminal for outputting information based on data entered in the corresponding data input terminal;
    a data processing server, in communication via a network with, and for centrally controlling, each of the data input terminals and each of the data output terminals, the data processing server comprising a storage medium for storing electronic identification pairing information linking each of the data input terminals with its corresponding data output terminal in accordance with the predetermined one-to-one relationship; and
    a data output controller for controlling data output from each of the data output terminals, the data output controller being further configured to select, in response to an instruction from a specific data input terminal, the corresponding data output terminal linked to the specific data input terminal by referencing the electronic identification pairing information for the specific data input terminal and corresponding output terminal.

2. A network system as described in claim 1, wherein each of the data output terminals comprises a printer, and the data output controller controls each of the printers.

3. A network system as described in claim 2, wherein
    the data processing server further comprises:
        a print form storage medium for storing print forms for objects that can be printed, and
        a print data generator for referencing a print form and generating print data for printing an object based on an instruction from a data input terminal; and
    the data output controller further comprises a print data transmission module for sending the generated print data to the corresponding printer.

4. A network system as described in claim 3, wherein
    each data input terminal includes a payment processing function that comprises:
        a product information acquisition module for acquiring product information about products ordered by a customer,
        a payment method information acquisition module for acquiring information indicating whether a payment method selected for the ordered products is cash payment or credit card payment,
        a card information acquisition module for acquiring information pertaining to a credit card presented by the customer when credit card is selected as the method of payment, and
        a card transaction information transmission module for sending the product information and credit card information as card transaction information to
    the data processing server; and
        the data processing server further comprises:
        a card transaction information storage medium for storing the card information linked to the product information when card transaction information is received from the data input terminal,
        an order total calculator for calculating a total amount of the ordered products based on the product information,
        a card authorization module for acquiring a credit card authorization based on the card information, and
        a credit card transaction module for completing the credit card transaction based on the order total when charging the credit card is authorized by the card authorization module;
    the print data generator generates card authorization result print data for printing based on the card authorization result; and
    the print data transmission module sends the card authorization result print data to the corresponding printer.

5. A network system as described in claim 4, wherein the network system further comprises a cash transaction processing terminal that is centrally controlled over the network by the data processing server and that processes cash payments based on product information acquired by each data input terminal that does not have a cash payment processing function;

each data input terminal further comprises a cash transaction information transmission module for sending a product order number and product information as cash transaction information to the data processing server for later processing the cash payment when cash is selected as the payment method;

the data processing server further comprises a cash transaction information storage medium for storing the product order number linked to the product information when the cash transaction information is received from the data input terminal;

the print data generator generates product order receipt print data for printing a receipt object used to complete a cash transaction at the cash transaction processing terminal based on the product order number stored in the cash transaction information storage medium;

the print data transmission module sends the product order receipt print data to the corresponding printer;

each printer comprises a print mechanism for printing product order receipt print data to a receipt object; and the cash transaction processing terminal comprises:

a product order number reader for reading the product order number by image scanning the product order receipt print data printed on the receipt object, a product information reader for reading the product information from the cash transaction information storage medium of the data processing server based on the read product order number, and a cash payment processor for completing the cash transaction based on the product information.

6. A data input terminal as described in claim 1, wherein the network is a wireless network.

\* \* \* \* \*